US006697553B2

(12) United States Patent
Bhardwaj et al.

(10) Patent No.: US 6,697,553 B2
(45) Date of Patent: Feb. 24, 2004

(54) COMPACT, LOW INSERTION LOSS, HIGH YIELD ARRAYED WAVEGUIDE GRATING

(75) Inventors: Jyoti Kiron Bhardwaj, Cupertino, CA (US); Robert James Brainard, Sunnyvale, CA (US); David J. Chapman, San Jose, CA (US); Douglas E. Crafts, San Jose, CA (US); Zi-Wen Dong, Union City, CA (US); David Dougherty, Sunnyvale, CA (US); Erik W. Egan, Oakland, CA (US); James F. Farrell, San Jose, CA (US); Mark B. Farrelly, San Jose, CA (US); Niranjan Gopinathan, Santa Clara, CA (US); Kenzo Ishida, Saratoga, CA (US); David K. Nakamoto, Sunnyvale, CA (US); Thomas Thuan Nguyen, San Jose, CA (US); Suresh Ramalingam, Fremont, CA (US); Steven M. Swain, San Jose, CA (US); Sanjay M. Thekdi, Santa Clara, CA (US); Anantharaman Vaidyanathan, San Jose, CA (US); Hiroaki Yamada, San Jose, CA (US); Yingchao Yan, Milpitas, CA (US)

(73) Assignee: JDS Uniphase Corporation, San Jose, CA (US)

( * ) Notice: Subject to any disclaimer, the term of this patent is extended or adjusted under 35 U.S.C. 154(b) by 18 days.

(21) Appl. No.: 10/077,581

(22) Filed: Feb. 15, 2002

(65) Prior Publication Data

US 2003/0156789 A1 Aug. 21, 2003

(51) Int. Cl.[7] .................................................. G02B 6/34
(52) U.S. Cl. ............................ 385/37; 385/24; 385/46; 385/43

(58) Field of Search ............................... 385/24, 37, 43, 385/46, 14, 15, 27, 39

(56) References Cited

U.S. PATENT DOCUMENTS 3,662,150 A    5/1972    Hartung ....................... 219/209
3,883,715 A    5/1975    Gebo ........................... 219/210

(List continued on next page.)

OTHER PUBLICATIONS

"VLSI Technology", Second Edition, 1988, pp. 258–269.
"Birefringence control in planar waveguides using doped top layers", J. Canning, Optics Communications, May, 2001, pp. 225–228.

(List continued on next page.)

*Primary Examiner*—Hemang Sanghavi
*Assistant Examiner*—Scott A Knauss
(74) *Attorney, Agent, or Firm*—Allen, Dyer, Doppelt, Milbrath & Gilchrist, P.A.

(57) ABSTRACT

A planar lightwave circuit includes an arrayed waveguide grating (AWG), with input and output waveguides, partially curved array waveguides with respective length differences, and planar waveguide regions for focusing optical energy between the input/output and array waveguides. Optimal waveguide widths and spacing along the planar waveguide region facets are disclosed, which are largely determinative of AWG size and optical performance. Also disclosed are optimal cross-sectional waveguide dimensions (e.g., width and height); modified index of refraction difference between the waveguide core and cladding regions; and optimal array waveguide lengths, path length differences, and free spectral range. These features, especially when combined with advanced fiber attachment, passivation and packaging techniques, result in high-yield, high-performance AWGs (both gaussian and flattop versions).

78 Claims, 11 Drawing Sheets

U.S. PATENT DOCUMENTS

| | | | | |
|---|---|---|---|---|
| 4,684,783 | A | | 8/1987 | Gore .......................... 219/210 |
| 4,978,914 | A | | 12/1990 | Akimoto et al. .......... 324/158 F |
| 5,574,627 | A | | 11/1996 | Porter ........................ 361/719 |
| 5,585,024 | A | | 12/1996 | Kosugi ....................... 219/494 |
| 5,624,750 | A | | 4/1997 | Martinez et al. ............ 428/344 |
| 5,841,919 | A | * | 11/1998 | Akiba et al. ................... 385/37 |
| 5,917,272 | A | | 6/1999 | Clark et al. ................. 310/343 |
| 5,919,383 | A | * | 7/1999 | Beguin et al. ............... 219/209 |
| 5,994,679 | A | | 11/1999 | DeVeau et al. ............. 219/530 |
| 6,023,544 | A | * | 2/2000 | Dragone ...................... 385/37 |
| 6,058,233 | A | * | 5/2000 | Dragone ...................... 385/46 |
| 6,114,673 | A | | 9/2000 | Brewer et al. ............... 219/530 |
| 6,127,660 | A | | 10/2000 | Scafati ........................ 219/486 |
| 6,144,013 | A | | 11/2000 | Chu et al. .................... 219/209 |
| 6,330,152 | B1 | | 12/2001 | Vos et al. .................... 361/688 |
| 6,512,864 | B1 | * | 1/2003 | Lin et al. ...................... 385/24 |
| 2002/0001433 | A1 | * | 1/2002 | Hosoi ........................... 385/37 |
| 2003/0012497 | A1 | * | 1/2003 | McGreer et al. .............. 385/37 |

OTHER PUBLICATIONS

"Polarization Insensitive, Low–Loss, Low–Crosstalk Wavelength Multiplexer Modules", C.K. Nadler, et al., IEEE Journal of Selected Topics In Quantum Electronics, vol. 5, No. 5, Sep./Oct. 1999, pp. 1407–1412.

Birefringence Free Planar Optical Waveguide Made by Flame Hydrolysis Deposition (FHD) Through Tailoring of the Overcladding, A. Kilian, et al., Journal of Lightwave Technology, vol. 18, No. 2, Feb. 2000, pp. 193–198.

"Simple Method of Fabricating Polarisation–Insensitive and Very Low Crosstalk AWG Grating Devices" S.M. Ojha, et al., Electronics Letters, vol. 34, No. 1, Jan. 1998, pp. 78–79.

"400–channel 25–GHz ispacing arrayed–waveguide grating covering a full range of C– and L–bands", Y. Hida et al., Optical Fiber Communication Conference and Exhibit, 2001, OFC 2001, vol. 3, pp. wb2–2—wb2–3.

"Design Trade–offs for Arrayed Waveguide Grating DWDM MUX/DEMUX", Jane Lam et al., Lightwave Microsystems White Paper, at least as early as Jan., 2001, 9 pages.

"Arrayed–Waveguide Grating For Wavelength Division Multi/Demultiplexer With Nanometre Resolution", H. Takahashi et al., Electronics Letters, Jan. 18, 1990, vol. 26, No. 2.

PHASAR–Based WDM–Devices: Principles, Design and Applications, M.K. Smit et al., IEEE Journal of Selected Topics In Quantum Electronics, vol. 2, No. 2, Jun. 1996, pp. 236–250.

Silica–Based Planar Lightwave Circuits, A. Himeno, et al., IEEE Journal of Selected Topics In Quantum Electronics, vol. 4, No. 6, Nov./Dec. 1998, pp. 913–924.

"An N x N Optical Multiplexer Using a Planar Arrangement of Two Star Couplers", C. Dragone, IEEE Photonics Technology Letters, vol. 3, No. 9, Sep. 1991, pp. 812–815.

"Recent Progress on Arrayed Waveguide Gratings for DWDM Applications", A. Kaneko, et al., IEICE Trans. Electron. vol. E83–C, No. 6, Jun. 2000, pp. 860–868.

John Canning, "Birefringence control in planar waveguides using doped top layers", Optics Communications, May 8, 2001, pp. 225–228.

Christoph K. Nadler et al., "Polarization Insensitive, Low–Loss, Low–Crosstalk Wavelength Multiplexer Modules", IEEE Journal of Selected Topics in Quantum Electronics, vol. 5, No. 5, Sep./Oct. 1999, pp. 1407–1412.

A Kilian et al., "Birefringence Free Planar Optical Waveguide Made by Flame Hydrolysis Deposition (FDH) Through Tailoring of the Overcladding", Journal of Lightwave Technology, vol. 18, No. 2, Feb. 2000, pp. 193–198.

S.M. Ojha, "Simple Method of Fabricating Polarisation–Insensitive and Very Low Crosstalk AWG Grating Devices", Electronics Letters, vol. 34, No. 1, Jan. 8, 1998, pp. 78–79.

Y. Hida, "400–channel 25–GHz spacing arrayed–waveguide grating covering a full range of C–and L–bands", Optical Fiber Communication Conference and Exhibit, 2001, OFC 2001, vol. 3, pp. wb2–1—wb2–3.

Jane Lam et al., "Design Trade–offs for Arrayed Waveguide Grating DWDM MUX/DEMUX", Lightwave Microsystems White paper, at least as early as Jan., 2001, 9 pages.

H. Takahashi et al., "Arrayed–Waveguide Grating for Wavelength Division Multi–Demultiplexer with Nanometre Resolution", Eelctronics Letters, Jan. 18, 1999, vol. 26, No. 2, pp. 87–88.

Meint K. Smit et al., "PHASAR–Based WDM–Devices: Principles, Design and Applications", IEEE Journal of Selected Topics in Quantum Electronics, vol. 2, No. 2, Jun. 1996, pp. 236–250.

Akira Himeno et al., "Silica–Based Planar Lightwave Circuits", IEEE Journal of Selected Topics in Quantum Eelctronics, vol. 4, No. 6, Nov./Dec. 1998, pp. 913–924.

C. Dragone, An N x N Optical Multiplexer Using a Planar Arrangement of Two Star Couplers, IEEE Photonics Technology Letters, vol. 3, No. 9, Sep. 1991, pp. 812–815.

Akimasa Kaneko et al., "Recent Progress on Arrayed Waveguide Gratings for DWDM Applications", IEICE Trans Electron., vol. E83–C, No. 6, Jun. 2000, pp. 860–868.

* cited by examiner

COMPACT, LOW INSERTION LOSS, HIGH YIELD ARRAYED WAVEGUIDE GRATING

CROSS-REFERENCE TO RELATED APPLICATIONS

This application relates to the following co-pending, commonly assigned U.S. Patent Applications, each of which is incorporated by reference herein in its entirety:

Ser. No. 09/901,474 entitled "Redundant Package for Optical Components" filed Jul. 9, 2001;

Ser. No. 09/977,065 entitled "Waveguide Stress Engineering and Compatible Passivation in Planar Lightwave Circuits" filed Oct. 12, 2001;

Ser. No. 10/010,931 entitled "High Thermal Efficiency, Small Form-Factor Packages Including Thermally Insulative Cavities, and Transfer Molded Variants" filed Nov. 20, 2001; and Ser. No. 10/001,266 entitled "Precision Fiber Optic Alignment and Attachment Apparatus" filed Nov. 30, 2001.

FIELD OF THE INVENTION

The present invention relates to planar lightwave circuits. More particularly, the present invention relates to improved arrayed waveguide grating (AWG) devices for wavelength-specific filtering and processing in optical communication systems.

BACKGROUND OF THE INVENTION

Fiber optic communication systems offer far greater capacity than their electrical counterparts (e.g., twisted pair, or coaxial cable) and are therefore attracting much attention as the number and complexity of bandwidth-intensive applications increase. This ever-increasing need for bandwidth that only fiber can deliver is resulting in the continued, widespread deployment of fiber networks.

Legacy fiber systems have for many years existed primarily as untapped, long-haul, point-to-point links between "central offices." But simple market forces are pushing fiber networks beyond central offices and into the more architecturally diverse terrain of "metro" markets.

In existing systems, a single wavelength band carrying a single modulated data stream is transmitted across a single fiber link. Digital time division multiplexing (TDM) of the data stream can be used to accommodate separate, independent data channels over the same wavelength band, but these systems require expensive up/down-conversion of the optical signal to an electrical version for multiplexing/demultiplexing the separate channels. While providing some level of operational channelization, TDM techniques generally do not increase the overall data capacity of a link.

Dense wavelength division multiplexing (DWDM) enables the transmission of multiple, independent wavelength bands across a single fiber, thus providing some channelization and a much greater data capacity. Predictably, this capability has resulted in the requirement to add or drop these wavelength bands along the previously untapped lengths of fiber to provide access to the individual wavelength bands. Optical add/drop multiplexers (OADMs) are employed for this function, enabled by arrayed waveguide grating (AWG) components for filtering and forwarding individual wavelengths. AWGs are in the class of "integrated," wafer-based optical components. They include an on-chip array of closely spaced waveguides having carefully controlled, differing path lengths which cause constructive phase interference patterns on an optical signal transmitted into the array.

AWGs can be useful in many optical communication applications where wavelength-specific filtering and processing are required. Unlike the legacy TDM systems, AWGs function purely in the optical domain when filtering the independent wavelength bands and thus do not require expensive, electrical up/down conversion. As all-optical wavelength filtering components, AWGs have become attractive for optical communication systems. However, as with any component, many technical and economic factors impact AWGs' viability in the market.

AWGs are thin, fragile chips with narrow waveguides produced using planar lightwave circuit (PLC) processing techniques. The waveguides can be fabricated by forming (e.g., etching) waveguide core patterns over a substrate and undercladding. A doped glass overcladding (e.g., borophosphate silicate glass or BPSG) is then formed over the cores, to complete the waveguide formation. As an "integrated" PLC component in a fiber optic system, the optical signals are usually coupled (e.g., at the chip edge) between input and output fiber optics and the on-chip waveguides, leading to concerns about the device's end-to-end insertion loss. Individual device insertion loss is an important parameter in optical systems because the collective optical link power budget is usually of paramount importance to designers. Since multiple components may be cascaded in series, along with very long lengths of fiber, unacceptable signal losses may result, and can only be remedied by the use of more expensive optical sources (i.e., lasers) or optical amplification. The end-to-end insertion loss through an AWG component is governed primarily by the fiber interfaces to the chip, as well as the signal paths through the AWG itself.

Crosstalk, or channel isolation, is a ratio of power in one channel to the highest level of power meant for that channel but resident in other channels (i.e., for any other channel the term "non-adjacent channel isolation" is used; and for the adjacent channel the term "adjacent channel isolation" is used). Crosstalk arises from imperfections in array fabrication, leading to light scattering and errors in focusing the light into the proper output waveguide.

Another particular concern for PLC waveguides, including those in AWGs, is their sensitivity to stress imbalances, and the impact of stress imbalances on optical performance. These stresses can be induced by external environmental conditions, and/or by the fabrication process itself. Stress-induced birefringence in waveguides leads to unacceptably high polarization dependent loss (PDL). Because the materials used for the waveguide layers are different, with differing properties (e.g., differing coefficients of thermal expansion (CTEs)), intra- and inter-layer stresses exist and will result in high levels of waveguide PDL. The fabrication process, and product packaging against environmental conditions, are both key concerns for managing PDL.

In addition to the above-mentioned technical issues, the commercial issues of mass production of AWGs at reasonable costs must also be considered. To enter the market at a reasonable price point, one must consider the absolute number of acceptable die output from the manufacturing process, as well as the manufacturing "yield," i.e., the ratio of the number of acceptable die to the total number of die on that wafer.

Multiple PLC die are usually patterned on a single wafer, and it is desirable to layout as many die per wafer as possible, because of the fixed expense of processing a single wafer in a single production run. This argues against larger AWG devices, which decrease the number of die per wafer, and thus the number of die per production run.

Larger device sizes can also lead to other adverse performance effects, directly impacting manufacturing yield. Process uniformity across a wafer is usually a concern, but that concern is magnified for larger wafer sizes, and for larger individual die sizes, since it is more difficult to maintain strict process uniformity as surface area of a device increases. The refractive index, etch depths and etch biases are all process-controlled parameters which can vary across a wafer surface. Variation of these parameters within a die area can cause adverse optical effects (e.g., crosstalk). Significant "micro" variance in these parameters over smaller areas of a wafer is not expected, and thus a smaller die size will exhibit greater uniformity over its surface area. But "macro" variances across the wafer may occur, and a larger die size including such variances will cause optical performance degradation in the device within that die. As process technology shifts from six (6) inch wafer size to eight (8) inch wafer sizes, concerns about uniformity increase accordingly.

Various techniques have been proposed to address each of the above concerns individually. However, most proposals suffer from a fundamental weakness: they lack any significant consideration of the complex interaction between the process technology used to fabricate the device structures, the resultant device structures, the process economics, and optimizations to the process and structures based not only on repeated performance testing, but on environmental and reliability concerns. Moreover, the known proposals usually contain only vague design guidelines, without providing any device specifics, as a function of processes and economics, for suitable AWGs.

What is required, therefore, are improved arrayed waveguide gratings (AWGs), and methods for their fabrication, having the desired performance and reliability characteristics, especially in the loss, isolation, PDL and packaging areas discussed above, while also considering the economic issues for successful fabrication and commercialization.

SUMMARY OF THE INVENTION

These requirements are met, and further advantages are provided, by the present invention which in one aspect is a planar lightwave circuit, and methods for its fabrication and use, having an arrayed waveguide grating (AWG). The AWG has a plurality of input and output waveguides; a plurality of at least partially curved array waveguides with respective length differences for imparting respective phase delays on respective optical energy transmitted therein; an input planar waveguide region coupled between the input waveguides and array waveguides, for receiving input optical energy from at least one input waveguide and distributing the input energy to the array waveguides; and an output planar waveguide region coupled between the array waveguides and at least one output waveguide, for receiving the respectively phase delayed energy from the array waveguides and distributing said energy to the at least one output waveguide.

The present inventors have carefully balanced the above-stated requirements of optical performance, device size, and reliability, and have invented a unique, compact AWG having features such as:

Optimal widths and spacings of waveguides (especially the array and output waveguides) along the planar waveguide region facets, which are largely determinative of AWG size and optical performance;

Optimal waveguide cross-section (e.g., width and height) for optical performance and alignment to fiber cores;

Modified index of refraction difference (0.78%) between the waveguide core and cladding regions, as an independent variable to ensure proper optical energy confinement and therefore optical performance; and Optimal array waveguide numbers, lengths, path length differences, and free spectral range for the wavelength bands and band spacings of interest.

These features, especially when combined with advanced fiber array attachment, passivation and packaging techniques, advantageously result in a compact high-yield, high-performance AWGs (both gaussian and flattop versions), about 40 of which can be accommodated on a single 200 mm (i.e., 8 inch) wafer.

BRIEF DESCRIPTION OF THE DRAWINGS

The subject matter regarded as the invention is particularly pointed out and distinctly claimed in the concluding portion of the specification. The invention, however, both as to organization and method of practice, together with further objects and advantages thereof, may be best understood by reference to the following detailed description of the preferred embodiment(s) and the accompanying drawings in which:

BEST MODE FOR CARRYING OUT THE INVENTION

Figure 1:
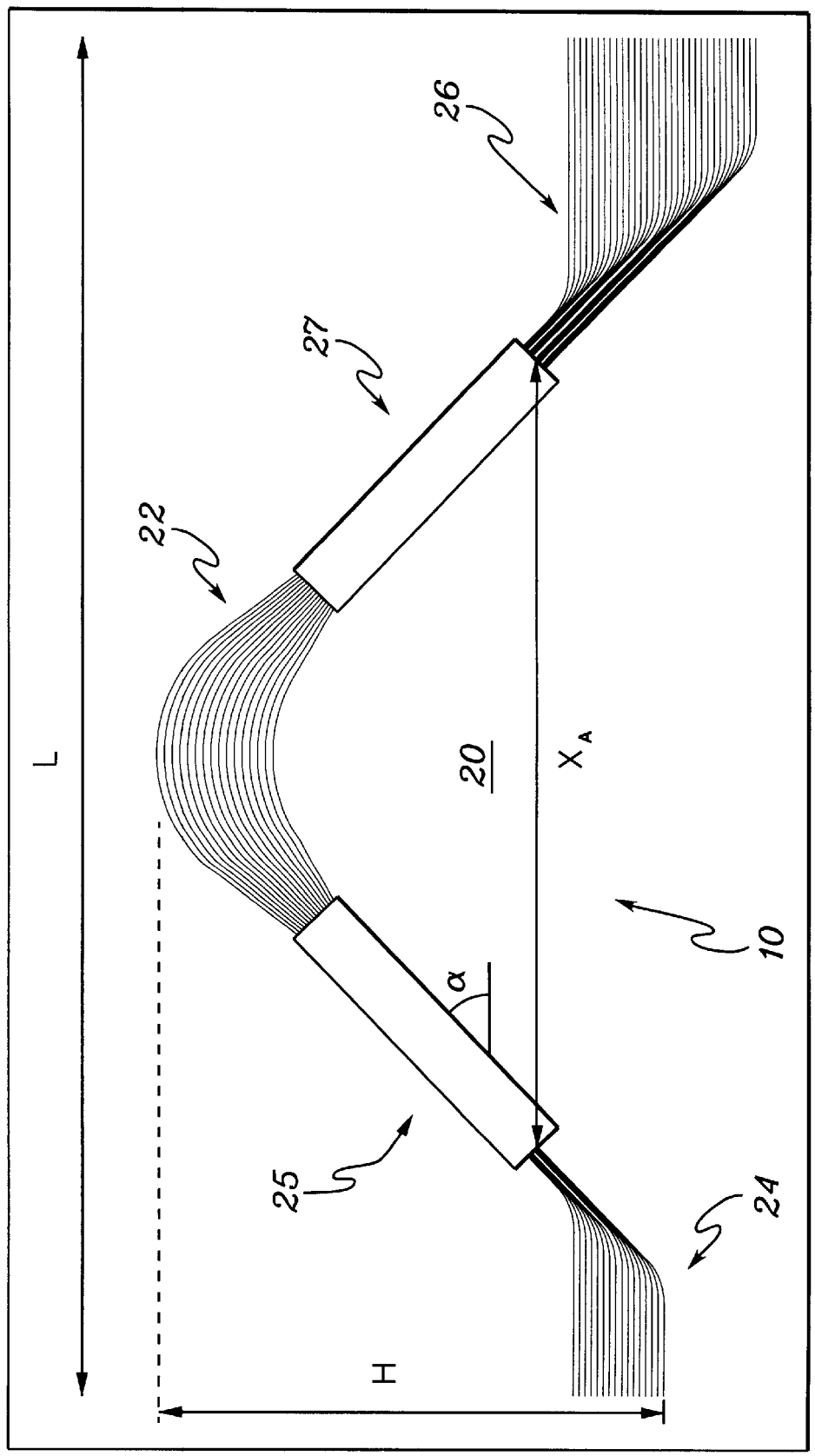
FIG. 1 is a top plan view of a planar lightwave circuit (PLC) with an arrayed waveguide grating (AWG) in accordance with an aspect of the present invention.

With reference to FIG. 1, an exemplary planar lightwave circuit (PLC) is shown having an arrayed waveguide grating (AWG) 10 formed on a substrate 20. An AWG includes an array of closely spaced array waveguides 22 having carefully controlled, differing path lengths which cause constructive phase interference patterns on the optical signals transmitted into the device. As discussed above, this technique is useful for multiplexing or demultiplexing optical signals transmitted from the array input waveguides 24—distributed by planar waveguide region 25 to array waveguides 22—then refocused through the output planar waveguide region 27 to output waveguides 26. As discussed below, the AWG of the present invention has a relatively compact height (H) and length (L) resulting in improved yield and uniformity, which are both important for successful fabrication and commercialization.

Figure 2A:
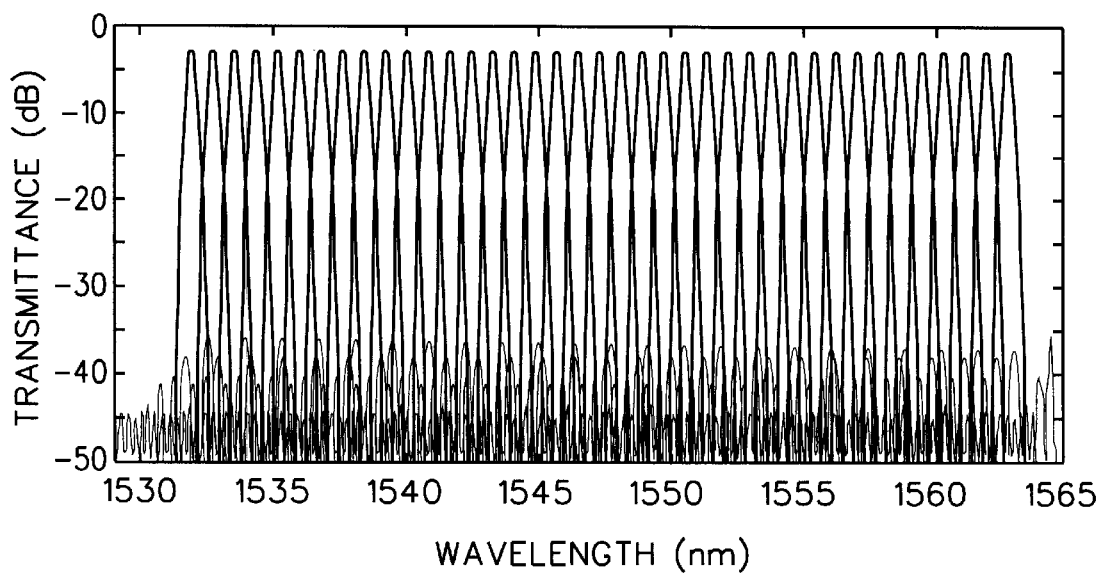
FIGS. 2A–B are performance spectra of 40 channel "gaussian" and "flattop" implementations of an AWG in accordance with an aspect of the present invention.
Figure 2B:
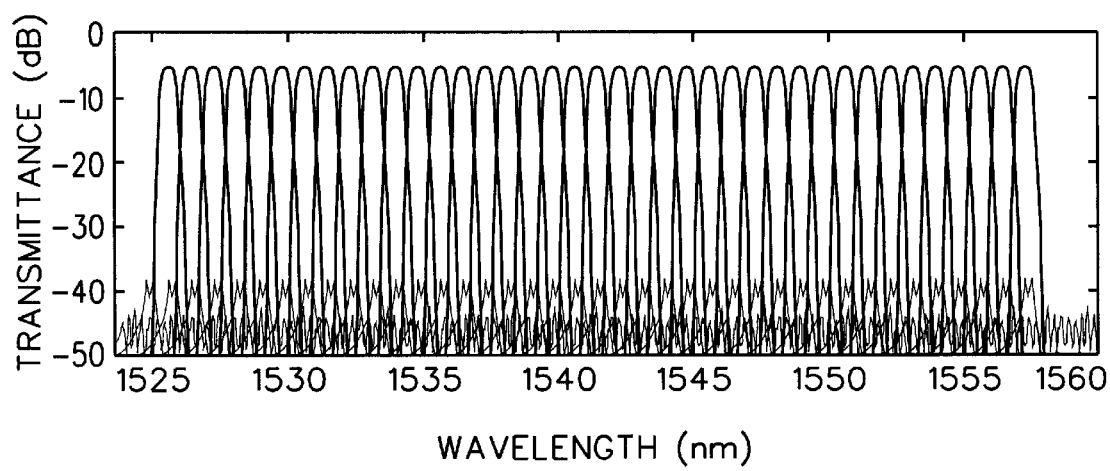

Approximate channel transmission spectra of exemplary "gaussian" and "flattop" AWGs of the present invention are depicted in FIGS. 2A–B. FIG. 2A depicts the "C" band spectral characteristics of a gaussian 40 channel AWG with a 100 GHz channel spacing, and 25 GHz channel bandwidths. The channels have a pointed or gaussian shape, indicating lower losses at their highest peaks, greater adjacent channel isolation, but requiring greater wavelength tuning accuracy. FIG. 2B depicts the spectral characteristics of a "flattop" 40 channel AWG, with the same channel spacing and bandwidths. Here the channels have a flatter spectral shape, indicating higher losses at their peaks and lower adjacent channel isolation, but allowing more tolerance for wavelength tuning because of their broader, "flat" spectrum. Any differences in the features for each of these AWG types are noted below where applicable.

Figure 3:
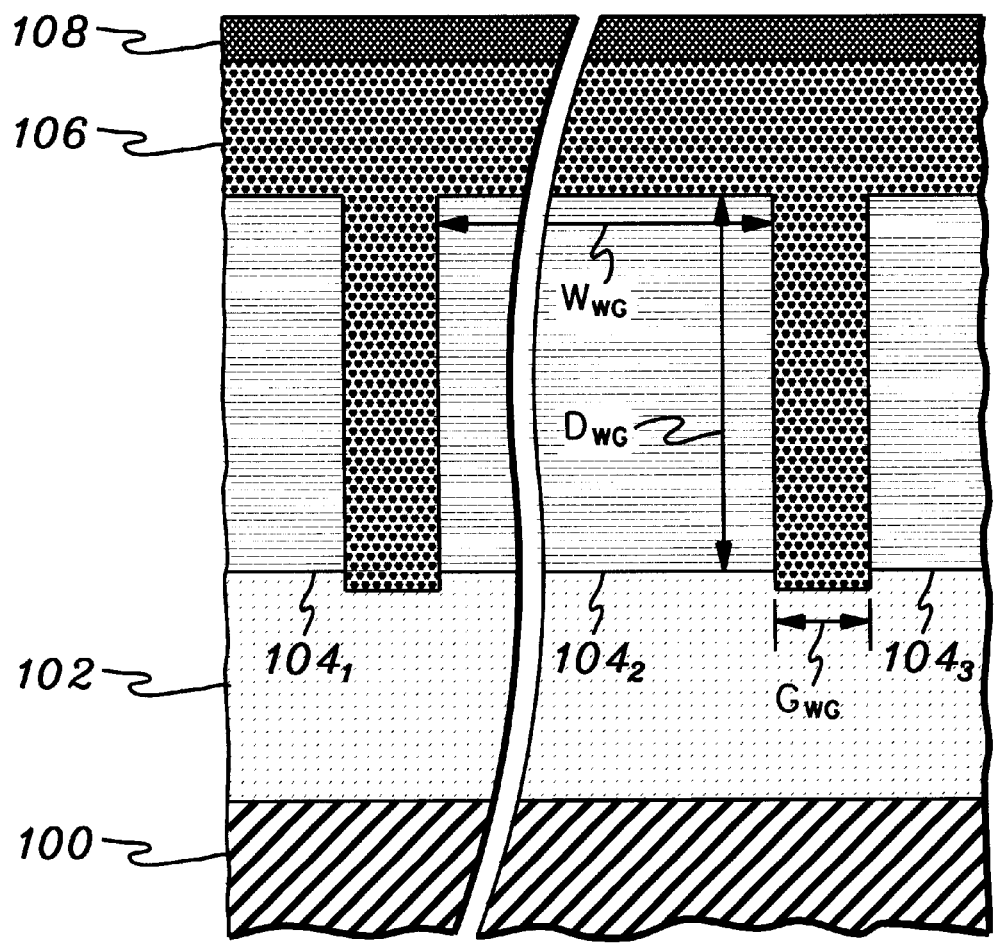
FIG. 3 is a cross-sectional view of exemplary waveguides in accordance with aspects of the present invention, showing exemplary dimensions, spacing, and therefore the required etching aspect ratios.

FIG. 3 depicts in cross-section the wafer-based "silica-on-silicon" waveguide configuration used for waveguides 22, 24 and 26 of FIG. 1A in accordance with the present invention. A buffer layer 102 (e.g., a thermal oxide or $SiO_2$) is formed (e.g., grown or deposited) over a silicon substrate 100. Though various deposition/formation techniques are disclosed herein, those skilled in the art will recognize that any number of known techniques can be used without departing from the principles of the present invention.

Buffer 102 serves as the "undercladding" for the waveguide cores $104_1 \ldots 104_3$, which are formed from a doped silica glass layer (e.g., doped with phosphorous, germanium, nitride, or any other dopant(s) which appropriately modify their refractive index $n_{core}$ upward—phosphate silicate glass (PSG) being one example). This layer is etched using, e.g., photolithographic mask and reactive ion etching (RIE) techniques. The term "core" is used broadly herein to connote any type of structure within which light is guided. An "overcladding" formed of a doped silica glass layer 106 (e.g., doped with boron, fluorine, phosphorous, germanium, nitride, or any dopant(s) which appropriately modify its refractive index $n_{clad}$ downward—boro-phosphate silicate glass (BPSG) being one example) is then deposited over the cores to complete their waveguide configuration. As discussed further below, a compatible passivation layer 108 can be formed over BPSG layer 108 for protection from adverse environmental conditions.

In accordance with the present invention, the linear waveguides 22/24/26 are formed to have the designated cross-sectional dimensions, along their steady state lengths, as noted in the following table. The waveguide depths $D_{WG}$ remain constant across the AWG, but their widths $W_{WG}$ may be tapered in some areas. As discussed further below, the gaps $G_{WG}$ between the waveguides in some areas, including at the facets of the planar waveguide regions (FIGS. 5B–D), are as low as about 1.75 μm, but larger in other areas: (Certain values throughout the Application are expressed in terms of "±" a preferred range. However, unless specifically set forth in the context, the present invention applies to broader ranges, and the term "about" is used herein to denote a range of ±10% of the given value.)

|  | Gaussian AWG | Flattop AWG |
|---|---|---|
| $W_{WG}$ | 5.3 ± 0.5 μm (tapered wider at planar waveguide, and chip edges) | 5.3 ± 0.5 μm (tapered wider at planar waveguide, and chip edges) |
| $D_{WG}$ | 6 μm | 6 μm |
| $G_{WG}$ | 1.9 ± 0.5 μm (at array end of planar waveguides) | 1.75 ± 0.5 μm (at array end of planar waveguides) |

The respective ratios of the depth of the waveguides (6 μm) to the smallest gap size (1.9 or 1.75 μm) are about 3.2:1 and 3.4:1, in contrast to conventional values of 2:1. These aspect ratios are enabled by precise formation of the core features during photolithographic mask deposition and etching (using, for example, reactive ion etching (RIE)); and careful control of the core and cladding layer deposition (using, for example, chemical vapor deposition (CVD) of the core and cladding material).

The 6 μm waveguide depth also offers other advantages. Though the width of the waveguides is tapered at the chip edges (to, e.g., 10–14 μm), the depth remains constant. Fiber interfacing to the chip is effected using, for example, any of the techniques described in the above-incorporated U.S. Patent Application entitled "Precision Fiber Optic Alignment and Attachment Apparatus." Briefly summarizing these techniques, individual device die are diced from the wafer into "chips" through the input and output waveguide regions, so that the waveguides terminate at the chip edges. These edges are polished, and are then aligned and affixed to correspondingly polished fiber array blocks, having the fiber optic cores terminating at their edges. Close alignment of each chip waveguide to each fiber core is important to avoid excess insertion losses.

Figure 4A:
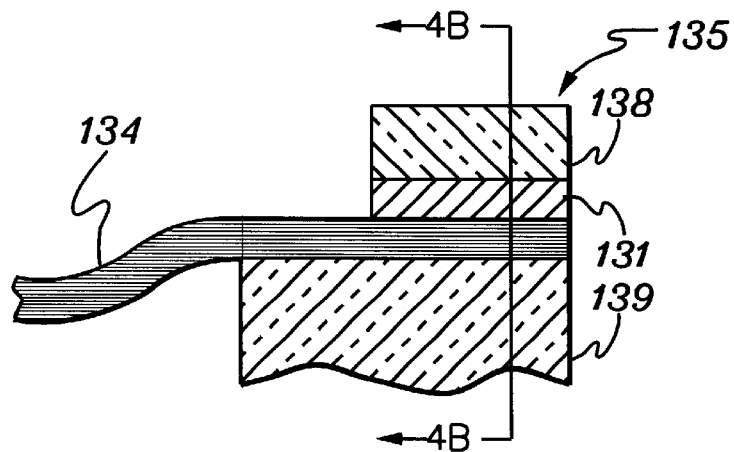
FIGS. 4A–C are cross-sectional views of an exemplary fiber array attachment technique for the AWG in accordance with an aspect of the present invention.
Figure 4B:
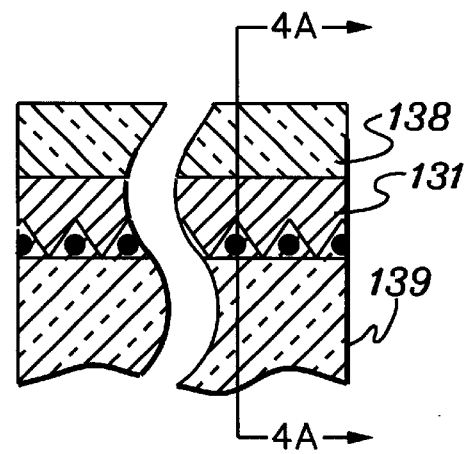
Figure 4C:
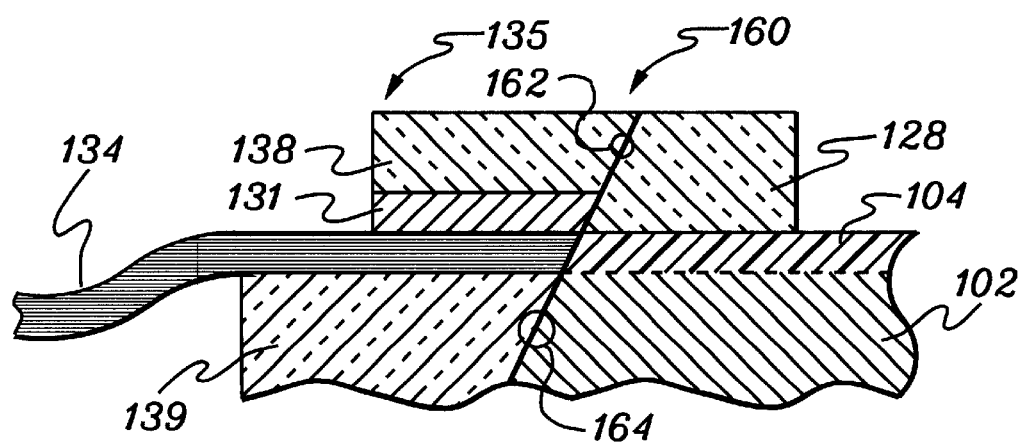

In one example, as disclosed in that copending Application and with reference to the cross-sections of FIGS. 4A–C, a fiber array groove assembly 135 holds at least one fiber optic 134 for coupling to the input/output waveguides 104. This exemplary groove assembly has a base 139, a cover 138, and a carrier 131 disposed between the base and cover. The carrier has V-grooves formed therein, and fiber optics 134 disposed in the grooves and therefore between the carrier and the base or cover and terminating at an edge surface 160 of the assembly. The base and cover have respective edge surfaces 164 and 162 which serve as attachment surfaces for attachment of the groove assembly to the planar lightwave circuit 102/104 (and also a glass block 128 affixed along its edge), thereby coupling the fiber optics to the input and/or output waveguides terminating at an edge of the planar lightwave circuit. Any/all techniques described in that Application are also applicable here, without departing from the scope of the present invention.

A standard SMF-28 fiber optic core is about 8.2 μm in diameter, and its mode field may extend to about 9 μm. The 6 μm core depth, while making the waveguides multi-mode, offer an advantage because this larger mode field better matches the mode field of the fiber. This improved matching decreases the amount of optical energy loss at these fiber interfaces, and therefore decreases the overall insertion loss of the device.

Figure 5A:
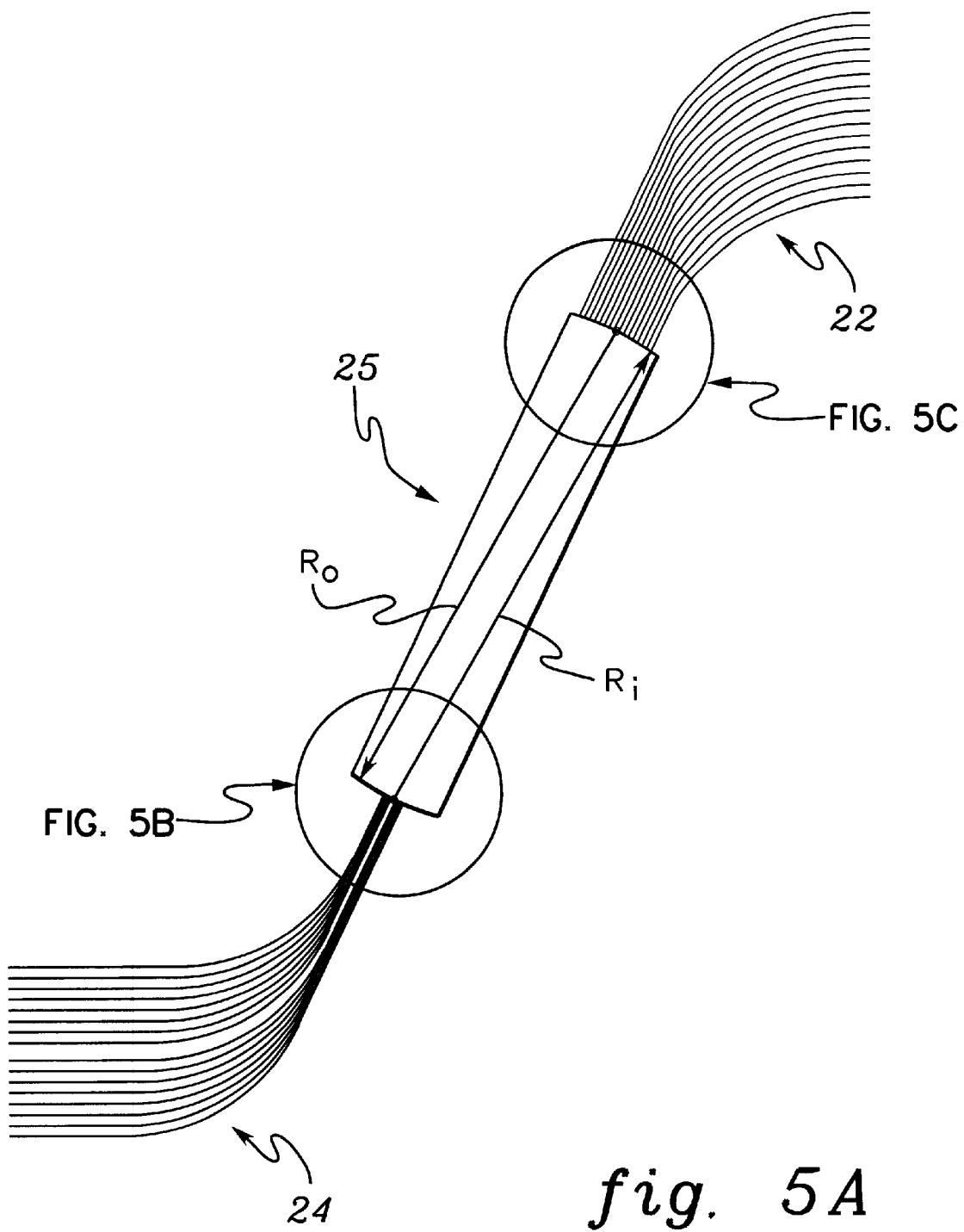
FIG. 5A is an enlarged view of the input planar waveguide of the AWG in accordance with an aspect of the present invention.

Referring now to the enlarged view of the input planar waveguide 25 of FIG. 5A, as discussed above, this region distributes light from input waveguides 24 to array waveguides 22. This planar waveguide region 25 (and its symmetrically formed output region 27, which focuses light from array waveguides 22 to output waveguides 26) is formed concurrently with the linear waveguides discussed above, using the same materials and processes, and therefore also to a depth of approximately 6 μm (equivalent to that of waveguides 22/24/26). Because of their light distribution function, the radii (R) of these regions, and the formation of their slightly curved edges are important features. Moreover, the sizes of these regions largely determine the overall size of the AWG. The benefits of a smaller planar waveguide region size are: a smaller overall device, more die per wafer, better insertion loss, and protection against process non-uniformity across the planar waveguide. In exemplary embodiments of the present invention, their approximate lengths, expressed as radii (R) of the edge facets, measured from the center of the opposite edge as shown in FIG. 5A, are as follows:

|  | Gaussian AWG | Flattop AWG |
| --- | --- | --- |
| $R_o$ | 12200 μm ± 10% | 16450 μm ± 10% |
| $R_i$ | 12200 μm ± 10% | 16450 μm ± 10% |

These are relatively compact regions compared to other conventional devices, and since their size largely drives the overall size of the AWG, the AWG of the present invention is correspondingly smaller, leading to the advantages of uniformity and more die per wafer.

Figure 5B:
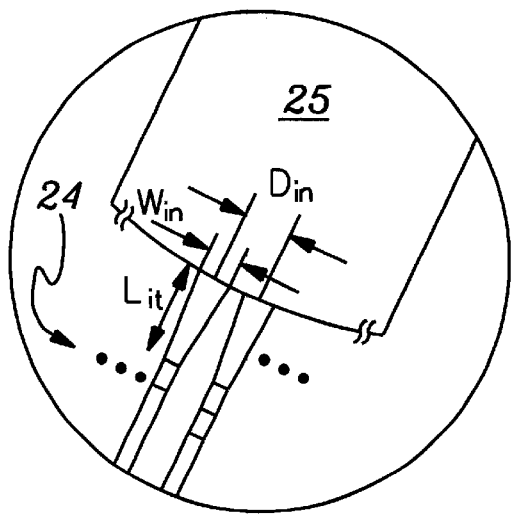
FIGS. 5B–D are further enlarged views of entry and exit facets of the planar waveguide regions.
Figure 5D:
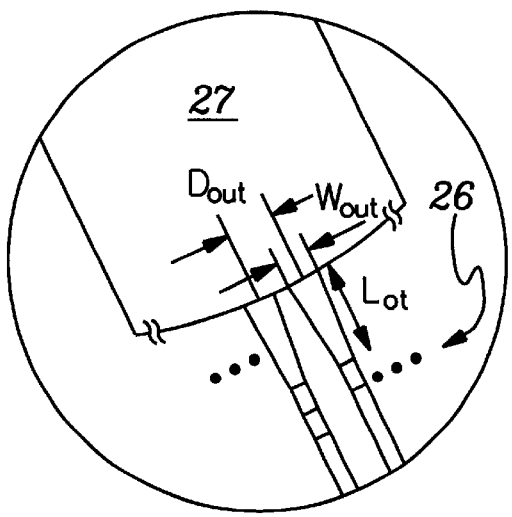
Figure 5C:
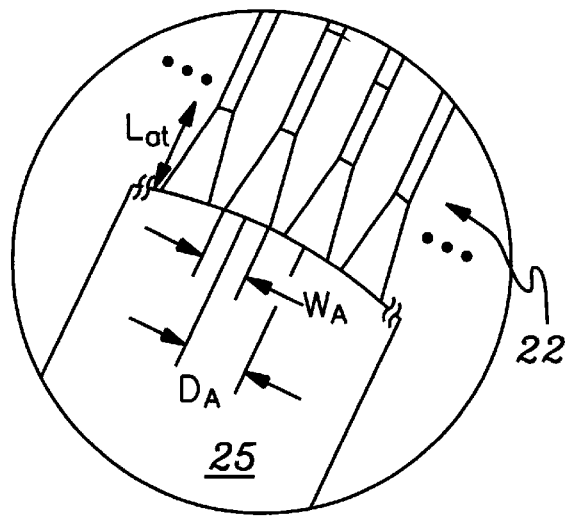

FIGS. 5B–C are magnified views of the edge facets of planar waveguide 25, with some dimensions noted. FIG. 5B is the input facet, where the respective widths of the input waveguides 24 are tapered (from the exemplary 5.3 μm width discussed above) to the values in the following table. The tapers may be linear (e.g., in the gaussian AWG) or slightly parabolic (e.g., in the flattop AWG). FIG. 5C is the opposing "array waveguide" facet, where the respective widths of the array waveguides 22 are also tapered (from the exemplary 5.3 μm widths discussed above). Also shown are the lengths L over which this taper occurs, and the waveguide spacings D. Preferably, this interface is formed symmetrically to the corresponding array facet of planar waveguide 27 (not shown).

FIG. 5D shows the output facet of planar waveguide 27 (which differs somewhat from the input facet of waveguide 25 of FIG. 5B).

|  | Gaussian AWG | Flattop AWG |
| --- | --- | --- |
| $W_{in}$ | 11.3 ± 1.0 μm | 25.0 ± 1.0 μm |
| $D_{in}$ | 17 ± 2.0 μm | 50 ± 5.0 μm |
| $G_{in} = D_{in} - W_{in}$ | 5.7 μm | 25.0 μm |
| $W_{in} / D_{in}$ | 0.66 ± 0.07 | 0.50 ± 0.05 |
| $L_{it}$ | 600 ± 100 μm | 245 ± 10 8μm |
| $W_A$ | 10.10 ± 0.5 μm | 9.25 ± 0.5 μm |
| $D_A$ | 12 μm ± 2.0 μm | 11.0 ± 2.0 μm |
| $G_A = D_A - W_A$ | 1.9 ± 0.5 μm | 1.75 ± 0.5 μm |
| $W_A / D_A$ | 0.84 ± 0.1 | 0.84 ± 0.1 |
| $L_{at}$ | 540 ± 50 μm | 420 ± 50 μm |
| $W_{out}$ | 11.3 ± 1.0 μm | 13.3 ± 1.0 μm |
| $D_{out}$ | 17 ± 2.0 μm | 25 ± 2.5 μm |
| $G_{out} = D_{out} - W_{out}$ | 5.7 μm | 11.7 μm |
| $W_{out} / D_{out}$ | 0.66 ± 0.07 | 0.53 ± 0.05 |
| $L_{ot}$ | 600 ± 100 μm | 800 ± 100 μm |

The gaps (G) between waveguides at the entry and exit facets is represented by the difference between the D and W dimensions. The small gaps (1.9 μm gaussian, and 1.75 μm flattop) between the array waveguides 22 at the interfaces to the planar waveguides 25 and 27 are important for at least two reasons:

First, decreasing these gaps has a beneficial effect on insertion loss, and loss uniformity, since larger gaps on the input side of the array waveguides 22 (implying more "empty" surface area along the facet) will result in energy dispersion and less energy coupled into the array waveguides. Moreover, the mutual coupling encouraged by this small gap spacing at the output side of array waveguides 22 improves the insertion loss uniformity of the device, because the gap spacing minimizes angular diffraction in the array, decreasing the rolloff in the outer channels. However, decreasing these gaps too much may increase crosstalk, due to phase errors caused by mutual coupling of the waveguides. The particular gap spacings disclosed provide an advantageous balance between low insertion loss and low crosstalk.

Second, the pitch and therefore gap size directly impacts the requisite sizes of the planar waveguide regions, which largely determine the size of the overall device, as discussed above. A smaller gap size therefore advantageously results in a smaller more uniform device, and more die per wafer.

The gaps (5.7 μm gaussian, and 11.7 μm flattop) between the output waveguides 22 at the interfaces to the planar wavguides 25 and 27 provide minimal crosstalk. Since the modal fields of the output channels overlap to some extent, these gaps should be chosen far enough apart to minimize crosstalk, but close enough to maintain a compact size of the array.

To maintain size and optical performance, it is desirable to hold the noted "width to pitch" ratios (W/D) at the facets constant when designing the AWG for different channel counts and channel spacings. The ratios disclosed are considered an independent aspect of the present invention, especially for different channel counts and spacings. In general, the size of the device is determined by the pitch, and the optical performance is determined by the waveguide widths.

The refractive index difference of the resultant waveguides is also a relevant feature and is defined herein as:

$$\Delta n = (n_{core} - n_{clad})/n_{core}$$

In one embodiment of the present invention, Δn=0.78%; and in another embodiment this value may be varied by ±0.02%. These values stand in contrast to the conventional value of 0.75%. This increase is partially due to the small waveguide gaps (1.9 μm gaussian, and 1.75 μm flattop) which may increase cross-talk, and the slightly larger, less confining waveguides (6.0×5.3 μm). To accommodate this gap size (thus the smaller size of the device; and the insertion loss, and loss uniformity benefits of smaller gap size), and the slightly less confining waveguide cross-sections, Δn is slightly increased to make the wavguides slightly more confining. Since Δn is changed by doping, it can be changed independently of the dimensional features discussed above.

Figure 6A:
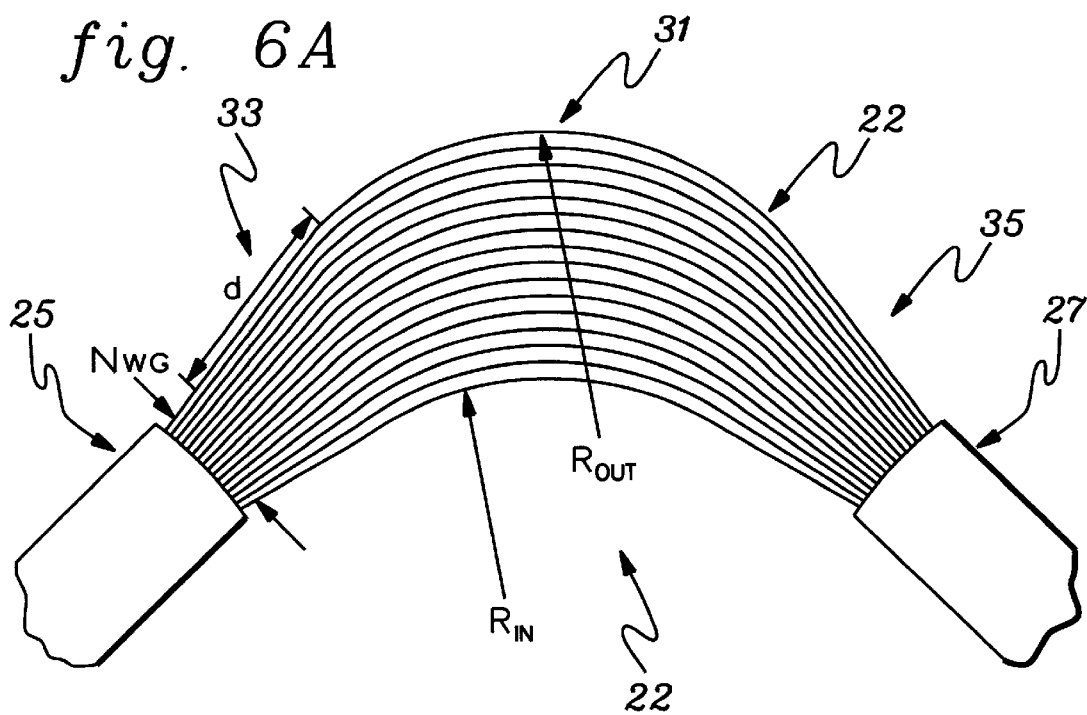
FIG. 6A is an enlarged view of the array waveguides of the AWG in accordance with an aspect of the present invention.

FIG. 6A depicts the array waveguides 22, with exemplary dimensional values contained in the table below, in accordance with the present invention. The number of waveguides is designated $N_{WG}$, and differs somewhat for the gaussian and flattop AWGs. As discussed above, the parameter most relevant for array optical operation is the differing lengths of each of the waveguides in this region (increasing from bottom to top in FIG. 6A), which cause the constructive phase interference necessary for wavelength-selectivity of the device. For both AWG types, this value is 32 μm between adjacent waveguides. This length difference is implemented by changing the length of the "straight" portions of these waveguides 33/35 (length d—from an innermost value 0.0 to the outermost values in the table below); changing the waveguide radii in their central, curved portions 31 (from the inner $R_{in}$ to outer $R_{out}$ values below); and changing the spacing between waveguides. The minimum radii (necessary to avoid unwanted polarization and radiative losses) are shown, as well as the range of radii between the innermost, bottom waveguide ($R_{in}$) and the outermost, top waveguide ($R_{out}$).

|  | Gaussian AWG | Flattop AWG |
| --- | --- | --- |
| $N_{WG}$ | 192 ± 20 | 280 ± 20 |
| Δl | 32 μm (±0.1 μm) | 32 μm (±0.1 μm) |
| $R_{min}$ | 5000 μm | 5000 μm |
| $R_{in}$ | 7300 ± 100 μm | 6500 ± 100 μm |
| $R_{out}$ | 5300 ± 100 μm | 5600 ± 100 μm |
| D | 0.0 – 3400 ± 100 μm | 0.0 – 4600 ± 100 μm |

The path length difference also determines the periodicity of the free spectral range ("FSR") of the AWG. For a 40–48 channel AWG of the present invention with 100 GHz spacing, a free spectral range of 6400 GHz results from the Δl chosen here (i.e., 64 total channels to remove the effects of outer channel rolloff). The ratio of the number of channels to the FSR is proportional to the insertion loss uniformity (rolloff), and would ideally be very low. The small gap spacings allow a relatively low ratio here, without increasing the overall size of the device.

Figure 6B:
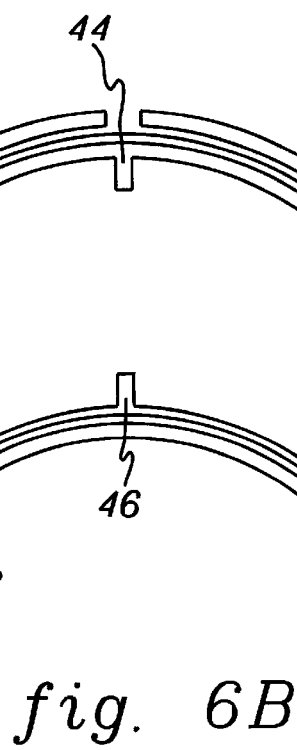
FIG. 6B is an enlarged view of the array waveguides in accordance with an aspect of the present invention including optional fill waveguides.

FIG. 6B shows an alternate embodiment of the present invention. Additional "fill waveguides" 40 and 42 are added adjacent to the outermost and innermost "active" array waveguides discussed above. They number, for example, 25 and 35, respectively. They are used to maintain process (e.g., etching) continuity over the inner and outer active waveguides of the array by ensuring the outer waveguides are substantially surrounded by similar structures at similar spacing. To ensure these excess waveguides do not interfere with optical performance of the AWG, light-blocking notches 44 and 46 are formed to prevent propagation though the waveguides. The fill waveguides also terminate at gaps (e.g., 48 and 50) near the planar waveguide to avoid interference with their optical performance. Excess waveguides 52 also provide additional features between nested AWGs across the wafer (see FIG. 7) to provide additional process uniformity across the wafer, especially for the more process-sensitive flattop AWG.

The designs discussed above with reference to FIGS. 1–6 all impact the overall size of the AWG device, while also considering the critical isolation and loss specifications. Returning briefly to the dimensions in FIG. 1, summarized in the table below, the 50 mm overall lengths result in very compact 40 channel devices, suitable for smaller packages, and high-volume manufacturing.

|  | Gaussian AWG | Flattop AWG |
| --- | --- | --- |
| L (FIG. 1) | 50 mm | 50 mm |
| $X_A$ (FIG. 1) | 29.1 ± 1.0 mm | 33.2 ± 1.0 mm |
| H (FIG. 1) | 32.7 mm | 37.8 mm |
| α (FIG. 1) | 44.2° | 50° |

Figure 7:
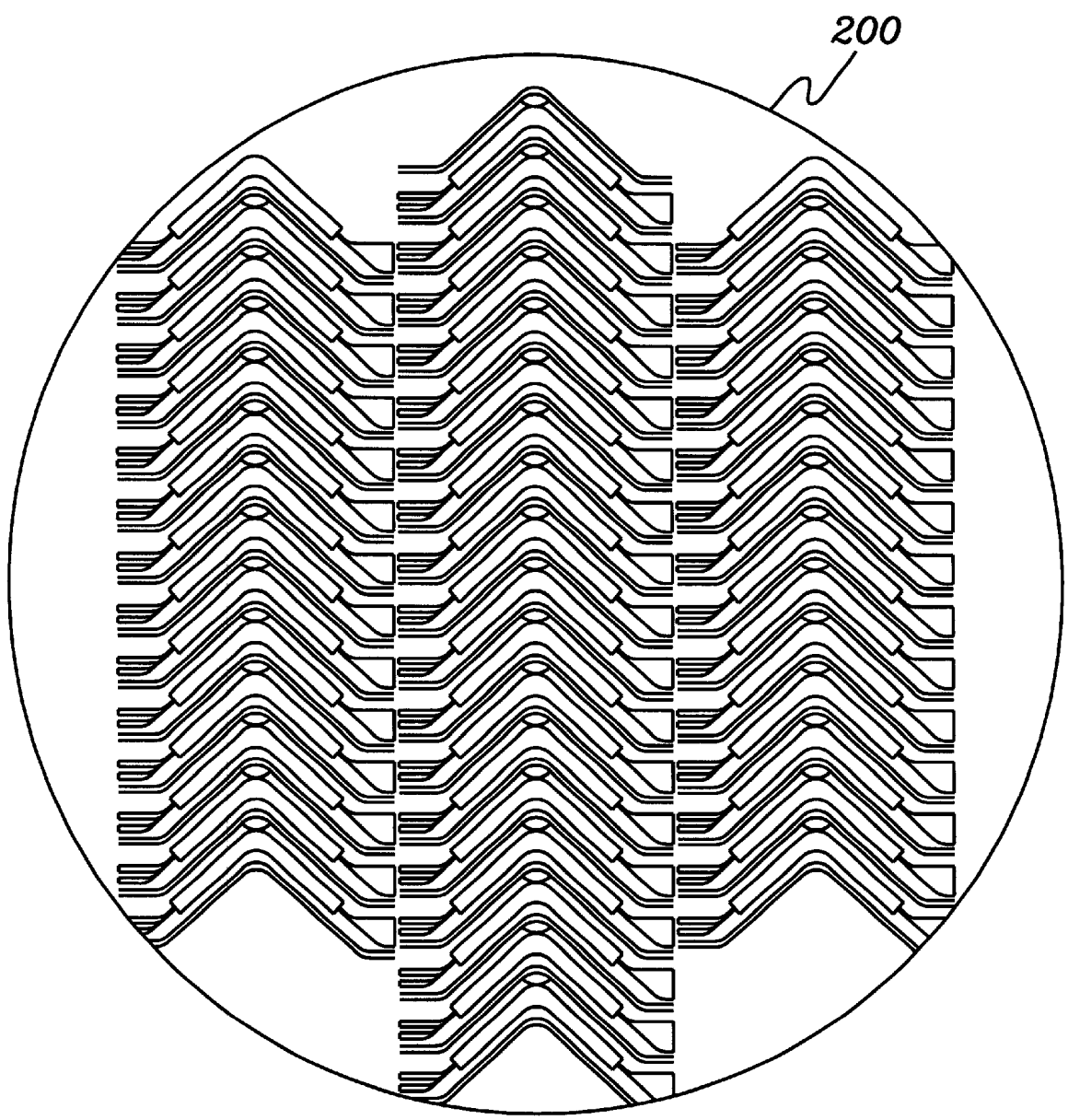
FIG. 7 shows the layout of more than 40 intact AWGs on a single 200 mm (8 inch) wafer in accordance with an aspect of the present invention.

For example, with reference to FIG. 7, a 200 mm ("8 inch") wafer 200 is shown having 41 intact 40-channel flattop AWGs. This stands in contrast to 6 inch wafer implementations of 40 channel devices having only 18 devices per wafer; and 4 inch wafer implementations of 40 channel devices having only 2 devices per wafer. The ability to lay out and process about 40 devices per wafer leads to numerous commercial advantages by greatly reducing the processing cost per device (since certain costs of processing a single wafer are similar regardless of how many devices are present).

However, the small device size (e.g., 50 mm) leads to other advantages as well. Process conditions (refractive indices, etch depths, etch biases) are known to change across the surface area of a wafer, but should stay constant within smaller, localized areas of the wafer. The optical properties of array waveguides 22 are particularly sensitive to process variations, because the phase interference pattern is easily impacted by process non-uniformities, leading to higher levels of crosstalk. By implementing a relatively small device size (50 mm) as a function of wafer diameter (200 mm), process variations within each device are minimized, and optical performance improved.

Smaller device size also leads to smaller packaging and thermal control requirements, which are both very desirable to system designers requiring multiple AWGs in a system.

Attention is now turned to certain aspects of the present invention which improve resistance of the fabricated AWGs to adverse environmental conditions. Certain industry standards exist to predict reliability under adverse environmental conditions (e.g., Telcordia standards), and the following techniques ensure that such devices will meet these standards, which is important for successful commercialization. First, stress compatible passivation is discussed which offers a vapor barrier, and ensures that any other environmental stresses do not cause unwanted birefringence and PDL in the waveguides. Second, thermally insulative outer packages are discussed.

Passivation:

In accordance with the above-incorporated U.S. Patent Application entitled "Waveguide Stress Engineering and Compatible Passivation in Planar Lightwave Circuits" (summarized briefly in the following paragraphs), certain stress balancing features are designed into the lower layers of the PLC to minimize birefringence. For example, BPSG layer (FIG. 2, layer 106) can be "stress engineered" to minimize stress on waveguides 104 thus decreasing polarization dependent loss (PDL); and a compatible passivation layer 108 can be deposited over BPSG layer 106 across the entire wafer, to create a chemical (e.g., vapor) barrier over the waveguides.

Stress engineering can be effected by varying dopant levels to tune the coefficient of thermal expansion (CTE) of the BPSG layer 106 according to that of the cores/undercladding/substrate. This doping is limited by the point at which the dopants diffuse out and negatively impact the index of refraction of this layer—known to be in the 8 mole percent range. To remove this stress field away from the cores, BPSG layer 106 is stress engineered by doping to, e.g., a CTE value of about 3.4 ppm (closer to that of silicon layer 100—3.5 ppm). By approximately matching the CTE of layer 106 to that of layer 100, a more symmetric stress field in layer 102 is obtained, and the center of that field is effectively moved away from its critical upper interface with the waveguide cores.

Adverse environmental conditions negatively impact these known stress engineering techniques. For example, stress engineering by doping the overcladding reduces the moisture resistance of this layer, and can eventually adversely affect the optical properties of the layer. Any sealing techniques must therefore not only perform their designated task of preventing the flow of moisture, etc.; they must also maintain, and not interfere with, the stress engineered environment of the lower layers. Passivation layer 108 is employed to seal the entire waveguide structure. Passivation layer 108 is designed to be non-interfering (i.e., compatible) with the stress balancing properties of the lower layers, while providing all of the benefits of passivation, including its barrier to vapor, chemicals, etc. This tailoring involves approximately matching the coefficient of thermal expansion (CTE) of the passivation layer 108 to the CTE of the BPSG overcladding layer 106. By using a particular composition, and carefully controlling the variables in the deposition process, this approximate match can be attained. A single passivation layer can be used, with a resultant film refractive index of approximately 2.0350, and CTE of 3.4 ppm, i.e., approximately matched to that of BPSG layer 106. Passivation layer 108 therefore does not add any stress to the previously stress-engineered system over which it is deposited.

Any other suitable passivation materials may be used for layer 108, including for example, hydrogenated silicon nitride of the form $Si_xN_yH_z$; or silicon-oxy-nitride of the form $Si_xO_yN_z$ (with or without hydrogen).

This barrier protection is becoming increasingly important as optical components are subjected to more adverse environments, and their related reliability standards and testing. Other stress engineering and passivation techniques are disclosed in that U.S. Patent Application, each of which can be combined with any of the other techniques disclosed herein in accordance with the present invention.

Packaging:

Also critical to an AWG's performance is protection from external thermal conditions, since an AWG usually includes a heating element, controlled by an external closed-loop feedback system, to maintain the waveguides at a fixed temperature setpoint. Any variance from this setpoint will result in degradation of the optical performance of the waveguides.

In accordance with the above-incorporated U.S. Patent Applications entitled "Redundant Package for Optical Components" and "High Thermal Efficiency, Small Form-Factor Packages Including Thermally Insulative Cavities, and Transfer Molded Variants," various thermally insulative cavities are formed around the AWG/heater combination to prevent thermal conduction either into or out of these components. Preferably, at least two thermally insulative barriers are formed around the AWG/heater.

Figure 8:
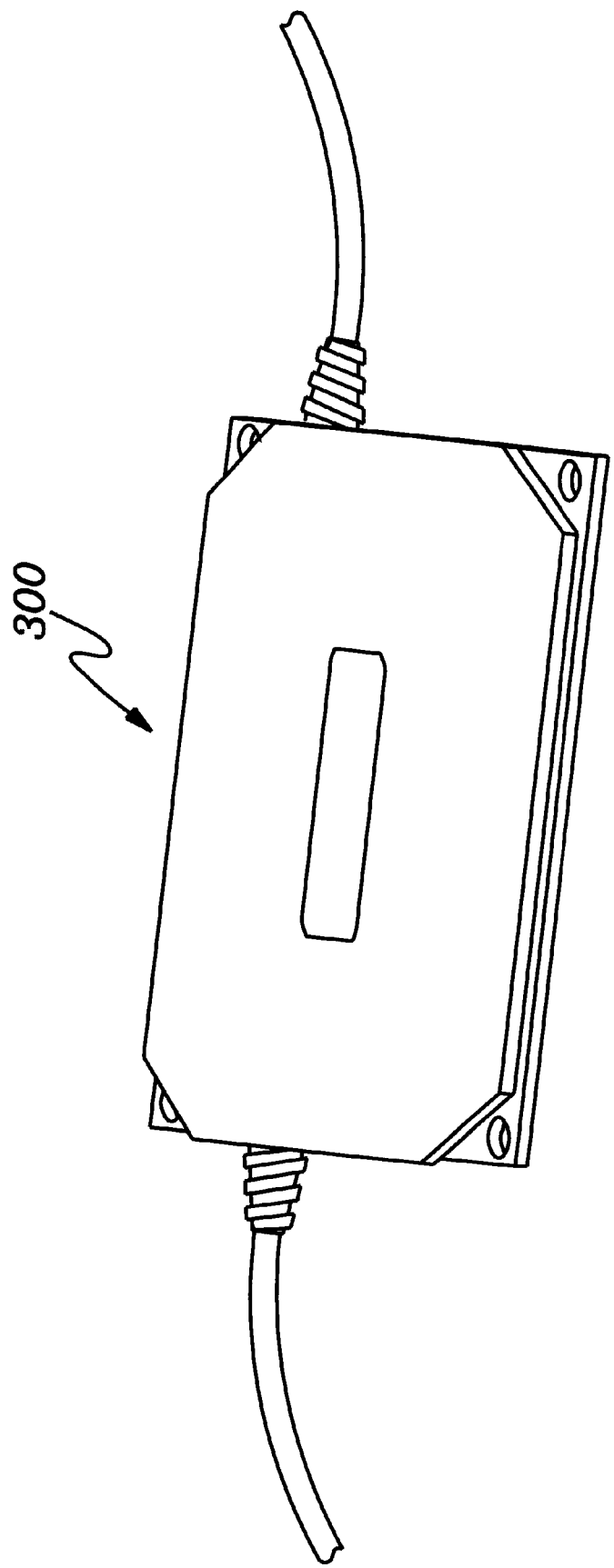
FIG. 8 is a perspective view of one exemplary, redundant package for an AWG in accordance with an aspect of the present invention.
Figure 9:
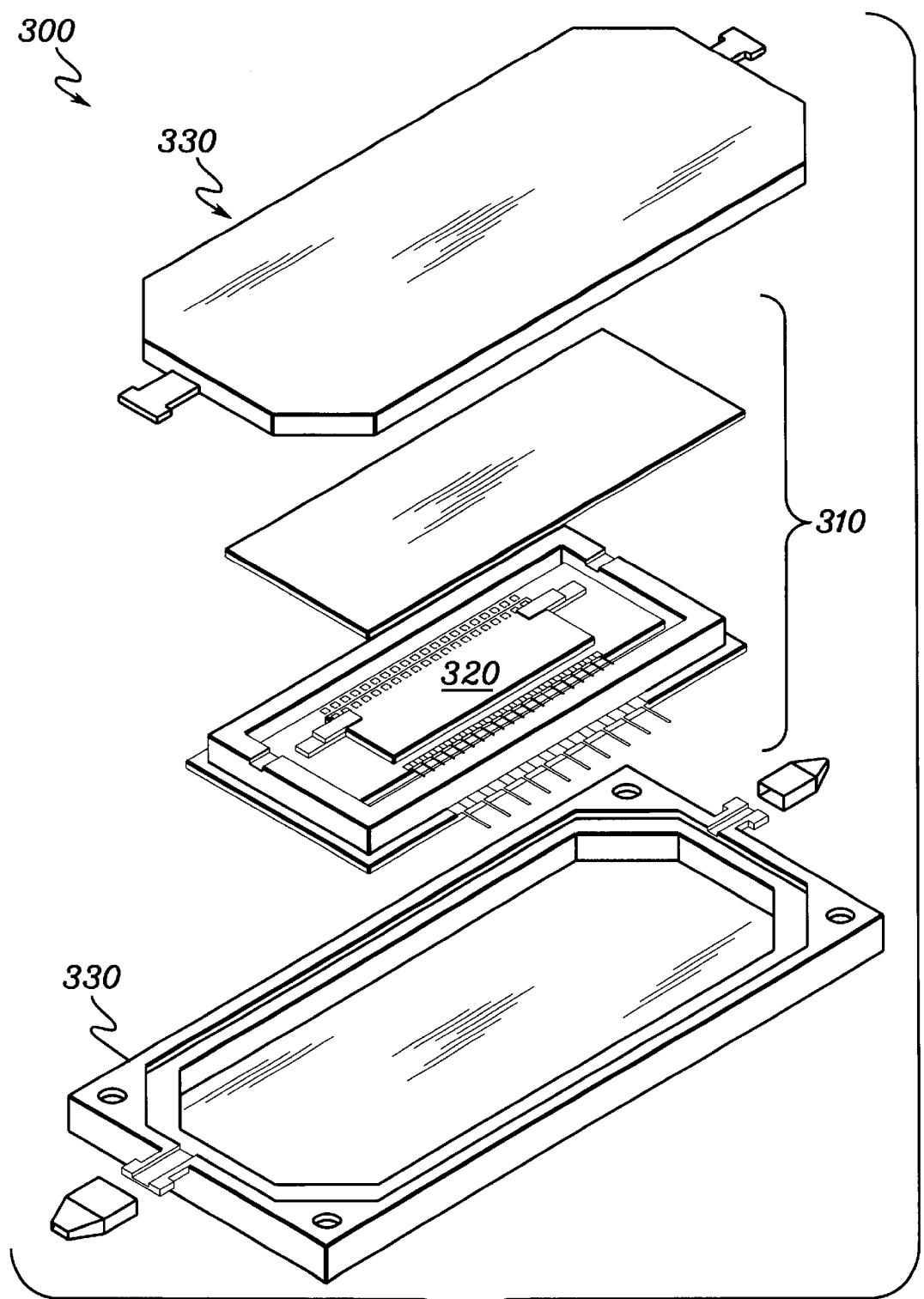
FIG. 9 is an exploded view of the inner and outer package shells of the redundant package of FIG. 8.

For example, with reference to the perspective views of FIGS. 8–9, a "redundant" package 300 is shown, including both an outer shell combination 330, and an inner package 310, within which the AWG PLC 320 is placed. The AWG PLC is thermally suspended in the inner package, which itself is thermally suspended within the outer package. Dual thermal barriers are therefore formed around the AWG.

Figure 10:
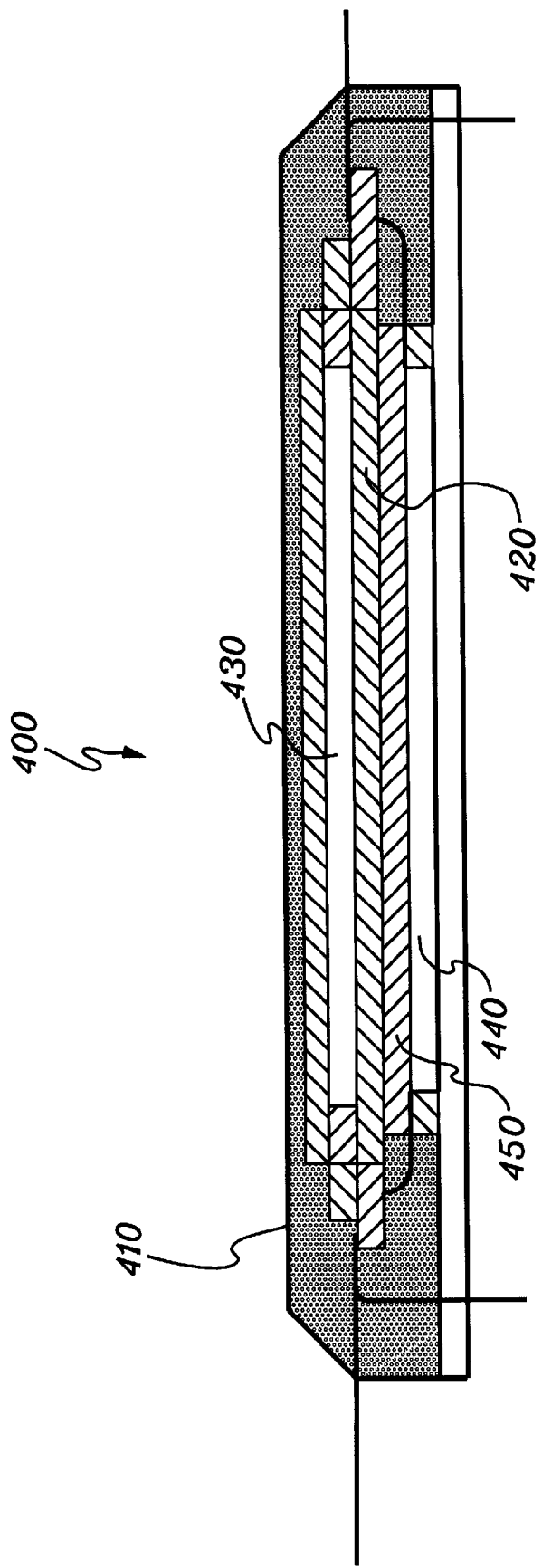
FIG. 10 is a cross-sectional view of a transfer-molded, thermally insulative package technique for an AWG in accordance with an aspect of the present invention.

As another packaging example, with reference to the package cross-section of FIG. 10, package 400 includes the AWG PLC 420, and underlying heater 450. The central, thermally sensitive AWG areas of the PLC are spaced from an outer injection-molded material 410 by internal thermal cavities 430 and 440, thereby offering a double layer of thermal isolation. Alternatively, as discussed in that Application, internal buffers can be used to form these cavities, enclosed by a shell forming the outer barrier.

Such packaging, either with or without the supplemental passivation layer discussed above, will greatly improve the PLC's resistance to external environmental factors, and maintain the sensitive internal thermal environment necessary for proper AWG operation.

Performance Summary:

The present invention includes a unique and effective combination of AWG device features, providing enhanced optical performance (e.g., insertion loss and channel isolation), compact size (increasing die uniformity, yield, producibility, and therefore commercial viability), and long-term reliability against adverse environmental factors (through passivation and packaging). Exemplary, typical performance parameters for the disclosed AWG in the form of a 40 channel demultiplexer are contained in the following table:

|  | Gaussian AWG 40 Channel Demux C, L Band 100 GHz Spacing 25 GHz Passband | Flattop AWG 40 Channel Demux C, L band 100 GHz Spacing 25 GHz Passband |
| --- | --- | --- |
| Insertion Loss | 2.8 dB | 4.8 dB |
| Insertion Loss Uniformity | 0.8 dB | 0.8 dB |
| Adjacent Channel Isolation | 30 dB | 30 dB |
| Non-Adjacent Channel Isolation | 38 dB | 35 dB |
| Polarization Dependent Loss | 0.2 dB | 0.2 dB |
| Wavelength Accuracy | ±.015 nm | ±0.15 nm |

The inventive AWG features most relevant to this performance are the small gaps between the array waveguides at the facets of the planar waveguide regions (about 1.9 µm gaussian, and 1.75 µm flattop); the width of the output waveguides at the output facets of the array waveguide regions (about 5.7 µm gaussian; 11.7 µm flattop); the steady-state waveguide cross-sections (about 6.0 µm×5.3 µm), and the refractive index difference (0.78%).

In addition to these best-of-class performance specifications, the packaged AWGs of the present invention have been shown under accelerated environmental testing to pass the strict reliability standards imposed on such devices, including the Telcordia GR 1221 standard, in large part because of the effective passivation and packaging of the present invention.

While the invention has been particularly shown and described with reference to preferred embodiment(s) thereof, it will be understood by those skilled in the art that various changes in form and details may be made therein without departing from the spirit and scope of the invention.

What is claimed is:

1. A planar lightwave circuit having an arrayed waveguide grating (AWG), the AWG comprising:

a plurality of input and output waveguides;
a plurality of at least partially curved array waveguides with respective length differences for imparting respective phase delays on respective optical energy transmitted therein;
an input planar waveguide region coupled between the input waveguides and array waveguides, for receiving input optical energy from at least one input waveguide and distributing the input energy to the array waveguides;
an output planar waveguide region coupled between the array waveguides and at least one output waveguide, for receiving the respectively phase delayed energy from the array waveguides and distributing said energy to the at least one output waveguide; and
a groove assembly for holding fiber optics for coupling to the input and/or output waveguides, the groove assembly having a base, a cover, a carrier disposed between the base and cover and having grooves formed therein; the fiber optics disposed in the grooves and therefore between the carrier and the base or cover and terminating at an edge surface of the carrier, wherein the base and cover have respective edge surfaces which serve as attachment surfaces for attachment of the groove assembly to the planar lightwave circuit thereby coupling the fiber optics to the input and/or output waveguides terminating at an edge of the planar lightwave circuit;
wherein the array waveguides are coupled to the input and output planar waveguide regions along respective array facets thereof, the array waveguides being expanded in width near the array facets and are spaced by about 1.9 $\mu$m at the facets, and
wherein the output waveguides are expanded in width near an output facet of the output planar waveguide region and spaced by about 5.7 $\mu$m at said facet.

2. The planar lightwave circuit of claim 1, wherein the input, output and array waveguides have about 6 $\mu$m depths, and about 5.3 $\mu$m widths throughout most of their lengths, the about 6 $\mu$m depth resulting in about a 3.2:1 aspect ratio in gaps between the array waveguides at the array facets of the input and output planar waveguide regions.

3. The planar lightwave circuit of claim 2, wherein each array waveguide is defined by a core with an index of refraction $\eta_{core}$, and a cladding with an index of refraction $\eta_{clad}$; and wherein the refractive index difference $(\Delta n) = (\eta_{core} - \eta_{clad})/\eta_{core}$ for the array waveguides is 0.78%±0.02%.

4. The planar lightwave circuit of claim 1, wherein:
the input and output planar waveguide regions have a length of about 12200 $\mu$m, and a distance between the center of an input facet of the input planar waveguide region and the center of an output facet of the output planar waveguide region of about 29.1 mm.

5. A wafer of about 200 mm in diameter having about 40 of said planar lightwave circuits of claim 4 thereon.

6. The planar lightwave circuit of claim 1, wherein:
the number of array waveguides is about 192, and the difference in length between adjacent array waveguides is about 32 $\mu$m.

7. The planar lightwave circuit of claim 1, wherein a ratio of array waveguide width to pitch at the facets of the planar waveguide region is about 0.84, and a ratio of output waveguide width to pitch at the output facet of the output planar waveguide region is about 0.66.

8. The planar lightwave circuit of claim 1, wherein the free spectral range within channels thereof is about 6400 GHz.

9. The planar lightwave circuit of claim 1, wherein the AWG exhibits a gaussian spectral shape in individual channels thereof.

10. The planar lightwave circuit of claim 1, further comprising:
a plurality of fill waveguides adjacent a perimeter array waveguide of the plurality of array waveguides and spaced therefrom by a distance similar to distances between individual waveguides of the array waveguides, the plurality of fill waveguides terminated at ends thereof to prevent substantial propagation of optical energy therein.

11. The planar lightwave circuit of claim 1, wherein the waveguides are formed from overcladding and core layers, and are formed with at least one stress balancing feature to balance stress and therefore minimize birefringence affecting the core, the planar lightwave circuit further comprising:
a protective passivation layer formed over the overcladding layer, the passivation layer formed to be substantially non-interfering with the balanced stress affecting the core provided by the stress balancing feature.

12. The planar lightwave circuit of claim 11, wherein the at least one feature comprises the overcladding layer formed over the core, and doped to balance stress affecting the core.

13. The planar lightwave circuit of claim 11 in combination with a package enclosing the planar lightwave circuit, the package comprising:
at least two thermally insulative regions surrounding the AWG of the planar lightwave circuit.

14. The combination of claim 13, wherein the at least two thermally insulative regions comprise:
an inner package within which the AWG is suspended, and an outer package enclosing the inner package; or
at least one thermally insulative cavity, around which a transfer molded material or outer shell is formed.

15. The planar lightwave circuit of claim 1 in combination with a package enclosing the planar lightwave circuit, the package comprising:
at least two thermally insulative regions surrounding the AWG of the planar lightwave circuit.

16. The combination of claim 15, wherein the at least two thermally insulative regions comprise:
an inner package within which the AWG is suspended, and an outer package enclosing the inner package; or
at least one thermally insulative cavity, around which a transfer molded material or outer shell is formed.

17. A method of fabricating a planar lightwave circuit having an arrayed waveguide grating (AWG), the method comprising:
forming a plurality of input and output waveguides;
forming a plurality of at least partially curved array waveguides with respective length differences for imparting respective phase delays on respective optical energy transmitted therein;
forming an input planar waveguide region coupled between the input waveguides and array waveguides, for receiving input optical energy from at least one input waveguide and distributing the input energy to the array waveguides; and forming an output planar waveguide region coupled between the array waveguides and at least one output waveguide, for receiving the respectively phase delayed energy from the array waveguides and distributing said energy to the at least one output waveguide;
wherein the array waveguides are coupled to the input and output planar waveguide regions along respective array facets thereof, the array waveguides being expanded in width near the array facets and spaced by about 1.9 μm at the facets, the output waveguides are expanded in width near an output facet of the output planar waveguide region and spaced by about 5.7 μm at said facet; and wherein the input, output and array waveguides have about 6 μm depths, and about 5.3 μm widths throughout most of their lengths, the about 6 μm depth resulting in about a 3.2:1 aspect ratio in gaps between the array waveguides at the array facets of the input and output planar waveguide regions.

18. The method of claim 17, wherein each array waveguide is defined by a core with an index of refraction $\eta_{core}$, and a cladding with an index of refraction $\eta_{clad}$, and wherein the refractive index difference $(\Delta n)=(\eta_{core}-\eta_{clad})/\eta_{core}$ for the array waveguides is 0.78%±0.02%.

19. The method of claim 17, wherein:

the input and output planar waveguide regions have a length of about 12200 μm, and a distance between the center of an input facet of the input planar waveguide region and the center of an output facet of the output planar waveguide region of about 29.1 mm.

20. A method of forming a wafer of about 200 mm in diameter including the method of forming the planar lightwave circuit of claim 19, wherein about 40 of said planar lightwave circuits are formed on the wafer.

21. The method of claim 17, wherein:

the number of array waveguides is about 192, and the difference in length between adjacent array waveguides is about 32 μm.

22. The method of claim 17, wherein a ratio of array waveguide width to pitch at the facets of the planar waveguide region is about 0.84, and a ratio of output waveguide width to pitch at the output facet of the output planar waveguide region is about 0.66.

23. The method of claim 17, wherein the free spectral range within channels thereof is about 6400 GHz.

24. The method of claim 17, wherein the AWG exhibits a gaussian spectral shape in individual channels thereof.

25. A planar lightwave circuit having an arrayed waveguide grating (AWG), the AWG comprising:

a plurality of input and output waveguides;

a plurality of at least partially curved array waveguides with respective length differences for imparting respective phase delays on respective optical energy transmitted therein;

an input planar waveguide region coupled between the input waveguides and array waveguides, for receiving input optical energy from at least one input waveguide and distributing the input energy to the array waveguides; and an output planar waveguide region coupled between the array waveguides and at least one output waveguide, for receiving the respectively phase delayed energy from the array waveguides and distributing said energy to the at least one output waveguide;

wherein the array waveguides are coupled to the input and output planar waveguide regions along respective array facets thereof, the array waveguides being expanded in width near the array facets and spaced by about 1.75 μm at the facets, wherein the output waveguides are expanded in width near an output facet of the output planar waveguide region and spaced by about 11.7 μm at said facet;

wherein the array waveguides are formed from overcladding and core layers, and are formed with at least one stress balancing feature to balance stress and therefore minimize birefringence affecting the core; and wherein a protective passivation layer is formed over the overcladding layer, the passivation layer formed to be substantially non-interfering with the balanced stress affecting the core provided by the stress balancing feature.

26. The planar lightwave circuit of claim 25, wherein the input, output and array waveguides have about 6 μm depths, and about 5.3 μm widths throughout most of their lengths, the about 6 μm depth resulting in about a 3.4:1 aspect ratio in gaps between the array waveguides at the array facets of the input and output planar waveguide regions.

27. The planar lightwave circuit of claim 26, wherein each array waveguide is defined by a core with an index of refraction $\eta_{core}$, and a cladding with an index of refraction $\eta_{clad}$; and wherein the refractive index difference $(\Delta n)=(\eta_{core}-\eta_{clad})/\eta_{core}$ for the array waveguides is 0.78%±0.02%.

28. The planar lightwave circuit of claim 25, wherein:

the input and output planar waveguide regions have a length of about 16450 μm, and a distance between the center of an input facet of the input planar waveguide region and the center of an output facet of the output planar waveguide region of about 33.2 mm.

29. A wafer of about 200 mm in diameter having about 40 of said planar lightwave circuits of claim 28 thereon.

30. The planar lightwave circuit of claim 25, wherein:

the number of array waveguides is about 280, and the difference in length between adjacent array waveguides is about 32 μm.

31. The planar lightwave circuit of claim 25, wherein a ratio of array waveguide width to pitch at the facets of the planar waveguide region is about 0.84, and a ratio of output waveguide width to pitch at the output facet of the output planar waveguide region is about 0.53.

32. The planar lightwave circuit of claim 25, wherein the free spectral range within channels thereof is about 6400 GHz.

33. The planar lightwave circuit of claim 25, wherein the AWG exhibits a flattop spectral shape in individual channels thereof.

34. The planar lightwave circuit of claim 25, further comprising:

a plurality of fill waveguides adjacent a perimeter array waveguide of the plurality of array waveguides and spaced therefrom by a distance similar to distances between individual waveguides of the array waveguides, the plurality of fill waveguides terminated at ends thereof to prevent substantial propagation of optical energy therein.

35. The planar lightwave circuit of claim 25, wherein the at least one feature comprises the overcladding layer formed over the core, and doped to balance stress affecting the core.

36. The planar lightwave circuit of claim 25, in combination with a package enclosing the planar lightwave circuit, the package comprising:

at least two thermally insulative regions surrounding the AWG of the planar lightwave circuit.

37. The combination of claim 36, wherein the at least two thermally insulative regions comprise:

an inner package within which the AWG is suspended, and an outer package enclosing the inner package; or at least one thermally insulative cavity, around which a transfer molded material or outer shell is formed.

38. The planar lightwave circuit of claim 25 in combination with a package enclosing the planar lightwave circuit, the package comprising:

a at least two thermally insulative regions surrounding the AWG of the planar lightwave circuit.

39. The combination of claim 38, wherein the at least two thermally insulative regions comprise:

an inner package within which the AWG is suspended, and an outer package enclosing the inner package; or at least one thermally insulative cavity, around which a transfer molded material or outer shell is formed.

40. The planar lightwave circuit of claim 25 in combination with a groove assembly for holding fiber optics for coupling to the input and/or output waveguides, the groove assembly having a base, a cover, a carrier disposed between the base and cover and having grooves formed therein; the fiber optics disposed in the grooves and therefore between the carrier and the base or cover and terminating at an edge surface of the carrier, wherein the base and cover have respective edge surfaces which serve as attachment surfaces for attachment of the groove assembly to the planar lightwave circuit thereby coupling the fiber optics to the input and/or output waveguides terminating at an edge of the planar lightwave circuit.

41. A method for forming a planar lightwave circuit having an arrayed waveguide grating (AWG), the method comprising:

forming a plurality of input and output waveguides;

forming a plurality of at least partially curved array waveguides with respective length differences for imparting respective phase delays on respective optical energy transmitted therein;

forming an input planar waveguide region coupled between the input waveguides and array waveguides, for receiving input optical energy from at least one input waveguide and distributing the input energy to the array waveguides; and forming an output planar waveguide region coupled between the array waveguides and at least one output waveguide, for receiving the respectively phase delayed energy from the array waveguides and distributing said energy to the at least one output waveguide;

wherein the array waveguides are coupled to the input and output planar waveguide regions along respective array facets thereof, the array waveguides being expanded in width near the array facets and spaced by about 1.75 μm at the facets, wherein the output waveguides are expanded in width near an output facet of the output planar waveguide region and spaced by about 11.7 μm at said facet; and wherein a ratio of array waveguide width to pitch at the facets of the planar waveguide region is about 0.84, and a ratio of output waveguide width to pitch at the output facet of the output planar waveguide region is about 0.53.

42. The method of claim 41, wherein the input, output and array waveguides have about 6 μm depths, and about 5.3 μm widths throughout most of their lengths, the about 6 μm depth resulting in about a 3.4:1 aspect ratio in gaps between the array waveguides at the array facets of the input and output planar waveguide regions.

43. The method of claim 42, wherein each array waveguide is defined by a core with an index of refraction $\eta_{core}$, and a cladding with an index of refraction $\eta_{clad}$; and wherein the refractive index difference $(\Delta n)=(\eta_{core}-\eta_{clad})/\eta_{core}$ for the array waveguides is 0.78%±0.02%.

44. The method of claim 41, wherein:

the input and output planar waveguide regions have a length of about 16450 μm, and a distance between the center of an input facet of the input planar waveguide region and the center of an output facet of the output planar waveguide region of about 33.2 mm.

45. A method of forming a wafer of about 200 mm in diameter including the method of forming the planar lightwave circuit of claim 44, wherein about 40 of said planar lightwave circuits are formed on the wafer.

46. The method of claim 41, wherein:

the number of array waveguides is about 280, and the difference in length between adjacent array waveguides is about 32 μm.

47. The method of claim 41, wherein the free spectral range within channels thereof is about 6400 GHz.

48. The method of claim 41, wherein the AWG exhibits a flattop spectral shape in individual channels thereof.

49. A planar lightwave circuit having an arrayed waveguide grating (AWG), the AWG comprising:

a plurality of input and output waveguides;

a plurality of at least partially curved array waveguides with respective length differences for imparting respective phase delays on respective optical energy transmitted therein;

an input planar waveguide region coupled between the input waveguides and array waveguides, for receiving input optical energy from at least one input waveguide and distributing the input energy to the array waveguides;

an output planar waveguide region coupled between the array waveguides and at least one output waveguide, for receiving the respectively phase delayed energy from the array waveguides and distributing said energy to the at least one output waveguide; wherein:

the number of array waveguides is about 192 and the difference in length between adjacent array waveguides is about 32 μm resulting in a free spectral range within channels thereof of about 6400 GHz, the input and output planar waveguide regions have a length of about 12200 μm, and the length of a horizontal axis between the center of an input facet of the input planar waveguide axis region and the center of an output facet of the output planar waveguide region of about 29.1 mm, and respective longitudinal axes of the planar waveguide regions form about a 44.2 degree angle with said horizontal axis.

50. The planar lightwave circuit of claim 49, wherein:

the array waveguides are coupled to the input and output planar waveguide regions along respective array facets thereof, the array waveguides being expanded in width near the array facets and spaced by about 1.9 μm at the facets, the output waveguides are expanded in width near an output facet of the output planar waveguide region and spaced by about 5.7 μm at said facet, and the input, output and array waveguides have about 6 μm depths, and about 5.3 μm widths throughout most of their lengths, the about 6 μm depth resulting in about a 3.2:1 aspect ratio in gaps between the array waveguides at the array facets of the input and output planar waveguide regions.

51. The planar lightwave circuit of claim 50, wherein each array waveguide is defined by a core with an index of refraction $\eta_{core}$, and a cladding with an index of refraction $\eta_{clad}$; and wherein the refractive index difference ($\Delta n$)= ($\eta_{core}-\eta_{clad}$)/$\eta_{core}$ for the array waveguides is 0.78%±0.02%.

52. A wafer of about 200 mm in diameter having about 40 of said planar lightwave circuits of claim 49 thereon.

53. The planar lightwave circuit of claim 49, wherein a ratio of array waveguide width to pitch at the facets of the planar waveguide region is about 0.84, and a ratio of output waveguide width to pitch at the output facet of the output planar waveguide region is about 0.66.

54. The planar lightwave circuit of claim 49, wherein the AWG exhibits a gaussian spectral shape in individual channels thereof.

55. The planar lightwave circuit of claim 49, further comprising:
 a plurality of fill waveguides adjacent a perimeter array waveguide of the plurality of array waveguides and spaced therefrom by a distance similar to distances between individual waveguides of the array waveguides, the plurality of fill waveguides terminated at ends thereof to prevent substantial propagation of optical energy therein.

56. The planar lightwave circuit of claim 49, wherein the waveguides are formed from overcladding and core layers, and are formed with at least one stress balancing feature to balance stress and therefore minimize birefringence affecting the core, the planar lightwave circuit further comprising:
 a protective passivation layer formed over the overcladding layer, the passivation layer formed to be substantially non-interfering with the balanced stress affecting the core provided by the stress balancing feature.

57. The planar lightwave circuit of claim 56, wherein the at least one feature comprises the overcladding layer formed over the core, and doped to balance stress affecting the core.

58. The planar lightwave circuit of claim 49 in combination with a package enclosing the planar lightwave circuit, the package comprising:
 at least two thermally insulative regions surrounding the AWG of the planar lightwave circuit.

59. The combination of claim 58, wherein the at least two thermally insulative regions comprise:
 an inner package within which the AWG is suspended, and an outer package enclosing the inner package; or
 at least one thermally insulative cavity, around which a transfer molded material or outer shell is formed.

60. The planar lightwave circuit of claim 49 in combination with a groove assembly for holding fiber optics for coupling to the input and/or output waveguides, the groove assembly having a base, a cover, a carrier disposed between the base and cover and having grooves formed therein; the fiber optics disposed in the grooves and therefore between the carrier and the base or cover and terminating at an edge surface of the carrier, wherein the base and cover have respective edge surfaces which serve as attachment surfaces for attachment of the groove assembly to the planar lightwave circuit thereby coupling the fiber optics to the input and/or output waveguides terminating at an edge of the planar lightwave circuit.

61. A method for forming a planar lightwave circuit having an arrayed waveguide grating (AWG), the method comprising:
 forming a plurality of waveguides, including
 forming a plurality of input and output waveguides;
 forming a plurality of at least partially curved array waveguides with respective length differences for imparting respective phase delays on respective optical energy transmitted therein;
 forming an input planar waveguide region coupled between the input waveguides and array waveguides, for receiving input optical energy from at least one input waveguide and distributing the input energy to the array waveguides;
 forming an output planar waveguide region coupled between the array waveguides and at least one output waveguide, for receiving the respectively phase delayed energy from the array waveguides and distributing said energy to the at least one output waveguide;
 wherein:
 the number of array waveguides is about 192 and the difference in length between adjacent array waveguides is about 32 µm resulting in a free spectral range within channels thereof of about 6400 GHz,
 the input and output planar waveguide regions have a length of about 12200 µm, and the length of a horizontal axis between the center of an input facet of the input planar waveguide axis region and the center of an output facet of the output planar waveguide region of about 29.1 mm, and
 respective longitudinal axes of the planar waveguide regions form about a 44.2 degree angle with said horizontal axis.

62. The method of claim 61, wherein:
 the array waveguides are coupled to the input and output planar waveguide regions along respective array facets thereof, the array waveguides being expanded in width near the array facets and spaced by about 1.9 µm at the facets,
 the output waveguides are expanded in width near an output facet of the output planar waveguide region and spaced by about 5.7 µm at said facet, and
 the input, output and array waveguides have about 6 µm depths, and about 5.3 µm widths throughout most of their lengths, the about 6 µm depth resulting in about a 3.2:1 aspect ratio in gaps between the array waveguides at the array facets of the input and output planar waveguide regions.

63. The method of claim 62, wherein each array waveguide is defined by a core with an index of refraction $\eta_{core}$, and a cladding with an index of refraction $\eta_{clad}$; and wherein the refractive index difference ($\Delta n$)=($\eta_{core}-\eta_{clad}$)/$\eta_{core}$ for the array waveguides is 0.78%±0.02%.

64. A method of forming a wafer of about 200 mm in diameter including the method of forming the planar lightwave circuit of claim 61, wherein about 40 of said planar lightwave circuits are formed on the wafer.

65. The method of claim 61, wherein a ratio of array waveguide width to pitch at the facets of the planar waveguide region is about 0.84, and a ratio of output waveguide width to pitch at the output facet of the output planar waveguide region is about 0.66.

66. The method of claim 61, wherein the AWG exhibits a gaussian spectral shape in individual channels thereof.

67. A planar lightwave circuit having an arrayed waveguide grating (AWG), the AWG comprising:
 a plurality of input and output waveguides;
 a plurality of at least partially curved array waveguides with respective length differences for imparting respective phase delays on respective optical energy transmitted therein;
 an input planar waveguide region coupled between the input waveguides and array waveguides, for receiving input optical energy from at least one input waveguide and distributing the input energy to the array waveguides;

an output planar waveguide region coupled between the array waveguides and at least one output waveguide, for receiving the respectively phase delayed energy from the array waveguides and distributing said energy to the at least one output waveguide; wherein:

the number of array waveguides is about 280 and the difference in length between adjacent array waveguides is about 32 μm resulting in a free spectral range within channels thereof of about 6400 GHz, the input and output planar waveguide regions have a length of about 16450 μm, and the length of a horizontal axis between the center of an input facet of the input planar waveguide region and the center of an output facet of the output planar waveguide region of about 33.2 mm, and respective longitudinal axes of the planar waveguide regions form about a 50 degree angle with said horizontal axis.

68. The planar lightwave circuit of claim 67, wherein:

the array waveguides are coupled to the input and output planar waveguide regions along respective array facets thereof, the array waveguides being expanded in width near the array facets and spaced by about 1.75 μm at the facets, the output waveguides are expanded in width near an output facet of the output planar waveguide region and spaced by about 11.7 μm at said facet, and the input, output and array waveguides have about 6 μm depths, and about 5.3 μm widths throughout most of their lengths, the about 6 μm depth resulting in about a 3.4:1 aspect ratio in gaps between the array waveguides at the array facets of the input and output planar waveguide regions.

69. The planar lightwave circuit of claim 68, wherein each array waveguide is defined by a core with an index of refraction $\eta_{core}$, and a cladding with an index of refraction $\eta_{clad}$; and wherein the refractive index difference $(\Delta n)=(\eta_{core}-\eta_{clad})/\eta_{core}$ for the array waveguides is 0.78%±0.02%.

70. A wafer of about 200 mm in diameter having about 40 of said planar lightwave circuits of claim 67 thereon.

71. The planar lightwave circuit of claim 67, wherein a ratio of array waveguide width to pitch at the facets of the planar waveguide region is about 0.84, and a ratio of output waveguide width to pitch at the output facet of the output planar waveguide region is about 0.53.

72. The planar lightwave circuit of claim 67, wherein the AWG exhibits a flattop spectral shape in individual channels thereof.

73. A method for forming a planar lightwave circuit having an arrayed waveguide grating (AWG), the method comprising:

forming a plurality of waveguides, including forming a plurality of input and output waveguides;

forming a plurality of at least partially curved array waveguides with respective length differences for imparting respective phase delays on respective optical energy transmitted therein;

forming an input planar waveguide region coupled between the input waveguides and array waveguides, for receiving input optical energy from at least one input waveguide and distributing the input energy to the array waveguides;

forming an output planar waveguide region coupled between the array waveguides and at least one output waveguide, for receiving the respectively phase delayed energy from the array waveguides and distributing said energy to the at least one output waveguide; wherein:

the number of array waveguides is about 280 and the difference in length between adjacent array waveguides is about 32 μm resulting in a free spectral range within channels thereof of about 6400 GHz, the input and output planar waveguide regions have a length of about 16450 μm, and the length of a horizontal axis between the center of an input facet of the input planar waveguide region and the center of an output facet of the output planar waveguide region of about 33.2 mm, and respective longitudinal axes of the planar waveguide regions form about a 50 degree angle with said horizontal axis.

74. The method of claim 73, wherein:

the array waveguides are coupled to the input and output planar waveguide regions along respective array facets thereof, the array waveguides being expanded in width near the array facets and spaced by about 1.75 μm at the facets, the output waveguides are expanded in width near an output facet of the output planar waveguide region and spaced by about 11.7 μm at said facet, and the input, output and array waveguides have about 6 μm depths, and about 5.3 μm widths throughout most of their lengths, the about 6 μm depth resulting in about a 3.4:1 aspect ratio in gaps between the array waveguides at the array facets of the input and output planar waveguide regions.

75. The method of claim 74, wherein each array waveguide is defined by a core with an index of refraction $\eta_{core}$, and a cladding with an index of refraction $\eta_{clad}$; and wherein the refractive index difference $(\Delta n)=(\eta_{core}-\eta_{clad})/\eta_{core}$ for the array waveguides is 0.78%±0.02%.

76. A method of forming a wafer of about 200 mm in diameter including the method of forming the planar lightwave circuit of claim 73, wherein about 40 of said planar lightwave circuits are formed on the wafer.

77. The method of claim 73, wherein a ratio of array waveguide width to pitch at the facets of the planar waveguide region is about 0.84, and a ratio of output waveguide width to pitch at the output facet of the output planar waveguide region is about 0.53.

78. The method of claim 73, wherein the AWG exhibits a flattop spectral shape in individual channels thereof.

* * * * *

UNITED STATES PATENT AND TRADEMARK OFFICE
CERTIFICATE OF CORRECTION

PATENT NO. : 6,697,553 B2
DATED : February 24, 2004
INVENTOR(S) : Bhardwaj et al.

Page 1 of 1

It is certified that error appears in the above-identified patent and that said Letters Patent is hereby corrected as shown below:

Column 7,
Line 60, "245 ± 10 8$\mu$m" should read -- 245 ± 10 $\mu$m --

Signed and Sealed this

Thirteenth Day of July, 2004

JON W. DUDAS
*Acting Director of the United States Patent and Trademark Office*